(12) United States Patent
Cundall

(10) Patent No.: US 12,155,613 B1
(45) Date of Patent: Nov. 26, 2024

(54) RECOMMENDATIONS OF EXPRESSIVE ILLUSTRATIONS BASED ON ANIMATION COMPATIBILITY

(71) Applicant: MICROSOFT TECHNOLOGY LICENSING, LLC, Redmond, WA (US)

(72) Inventor: Samuel Robert Cundall, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/476,213

(22) Filed: Sep. 27, 2023

(51) Int. Cl.
  *H04L 51/10* (2022.01)
  *G06F 3/0482* (2013.01)
  *G06T 13/20* (2011.01)
  *H04L 51/04* (2022.01)
  *H04L 51/216* (2022.01)

(52) U.S. Cl.
  CPC ............ *H04L 51/10* (2013.01); *G06F 3/0482* (2013.01); *G06T 13/20* (2013.01); *H04L 51/04* (2013.01); *H04L 51/216* (2022.05)

(58) Field of Classification Search
  None
  See application file for complete search history.

(56) References Cited

U.S. PATENT DOCUMENTS

| | | | |
|---|---|---|---|
| 2002/0154070 A1* | 10/2002 | Sato | H04N 5/222 348/E5.022 |
| 2015/0089389 A1* | 3/2015 | Cohen-Zur | G06F 3/04886 715/752 |
| 2017/0075878 A1 | 3/2017 | Jon et al. | |
| 2018/0210874 A1 | 7/2018 | Fuxman et al. | |
| 2019/0073801 A1* | 3/2019 | Stukalov | H04L 51/10 |
| 2019/0122403 A1 | 4/2019 | Woo et al. | |
| 2022/0269354 A1 | 8/2022 | Prasad et al. | |
| 2022/0329558 A1* | 10/2022 | Khan | H04L 51/234 |

(Continued)

OTHER PUBLICATIONS

Miklós, Bálint, "Express yo'self with emoji in Smart Reply", Retrieved from: https://blog.google/products/gmail/express-yourself-with-emoji-in-smart-reply/, Mar. 31, 2016, 4 Pages.

*Primary Examiner* — Quang N Nguyen
(74) *Attorney, Agent, or Firm* — Newport IP, LLC; Scott Y. Shigeta

(57) ABSTRACT

The disclosed techniques provide a messaging system with a user interface (UI) having a specific arrangement of suggested expressive illustrations, such as emojis. In some examples, a system analyzes a received emoji and provides a suggested list of emojis for a response. The suggested emojis are arranged in a way that candidate emojis capable of generating animation effects in combination with the received emoji, are listed higher in ranking, e.g., preceding, over other candidate emojis that cannot generate animation effects in combination with the received emoji. The system can rank individual emojis, or other types of graphical expressions, depending on whether a candidate emoji is capable of generating animated effects with the received emoji. In some embodiments, candidate emojis that are capable of generating animated effects precede candidate emojis that are incapable of generating animated effects.

18 Claims, 25 Drawing Sheets

(56) References Cited

U.S. PATENT DOCUMENTS

| | | |
|---|---|---|
| 2022/0392135 A1 | 12/2022 | Cundall et al. |
| 2022/0394001 A1 | 12/2022 | Cundall et al. |
| 2023/0016941 A1 | 1/2023 | Yu et al. |
| 2023/0144518 A1 | 5/2023 | Cundall |
| 2023/0156069 A1 | 5/2023 | Cundall |
| 2023/0401393 A1* | 12/2023 | Mitra .................. G06F 40/58 |

* cited by examiner

RECOMMENDATIONS OF EXPRESSIVE ILLUSTRATIONS BASED ON ANIMATION COMPATIBILITY

BACKGROUND

There are a number of different types of collaborative systems that allow users to communicate. For example, some portable electronic device applications and personal computer applications are useful for providing message-based communications. Some message-based communications include Multimedia Messaging Service (MMS) messages or other formats used by applications such as Slack, Facebook Messenger, WhatsApp, etc. Although existing collaborative systems provide features that enable users to exchange messages, some systems still have a number of drawbacks. Particularly, with small form factor devices, some user interface designs and input mechanisms present a number of challenges. One persistent challenge arises from the reduced-size input modalities, which are sub-optimal for typing. This difficulty is exacerbated by continued improvement in electronics packaging techniques that lend to smaller devices with even less room for keyboard placement.

To address some of the above-described issues, techniques for suggesting content for insertion in messages have been developed for some time. Some existing technologies for suggesting content reduce the need for manual user input and help reduce the need for keyboard entry and help with the small form factor for mobile devices. In one illustrative example, when a user receives a particular emoji from another user, a system may make a recommendation for suggesting a reply emoji that is based on an emoji that was used in the past. If a person has replied in the past using a smiley face emoji or a thumbs-up emoji, the system recommends those emojis for a reply to every message they receive. In another example, the system can recommend a reply emoji that mimics the received emoji. So, if a particular emoji is received by a user, such as a wine glass, the system may automatically recommend that particular emoji, the same wine glass, for a reply message.

Although these recommendations are useful in some scenarios, these techniques may not provide the accuracy and granularity that may be needed to generate an accurate response that conveys a user's sentiment or intent. Thus, some existing content recommendations may lead a person to a situation where they respond with the wrong message. In other situations, some existing recommendation systems may cause the need for the user to manually interact with an input device to find the correct reply or even search through a library to find the most optimal emoji or combination of emojis to generate an accurate reply. In such situations, a system may require a user to perform a number of manual entries to locate and select the correct emoji and then also require additional inputs to edit a message to convey a combination of messages. With the requirement of such complex interactions, more inadvertent inputs and corrective inputs, and unnecessary interactions, may occur.

SUMMARY

The disclosed techniques provide a messaging system with a user interface (UI) having a specific arrangement of suggested expressive illustrations, such as emojis. In some examples, a system analyzes a received emoji and provides a suggested list of emojis for a response. The suggested emojis are arranged in a way that candidate emojis capable of generating animation effects in combination with the received emoji, are listed higher in ranking, e.g., preceding, over other candidate emojis that cannot generate animation effects in combination with the received emoji. The system can rank individual emojis, or other types of graphical expressions, depending on whether a candidate emoji is capable of generating animated effects with the received emoji. In some embodiments, candidate emojis that are capable of generating animated effects precede candidate emojis that are incapable of generating animated effects.

The disclosed techniques solve the technical problem of content recommendations that are unable to provide contextually relevant illustrations. The technical problem is addressed by the technical solution of examining the context of an incoming emoji, and identifying candidate emojis by using the context of the incoming emoji and a determination of whether the incoming emoji has compatibility with a candidate emoji. The technical solution also involves a process of ranking multiple candidate emojis according to the ability of each candidate emoji to generate an animation with the incoming message. In one example, the system may surface one or more suggested emojis. This can be done by a process where the suggested emojis are selected based on the context of the original emoji and candidate emojis matching a context condition. The system can then arrange the suggested emojis on UI based on specific criteria, such as whether the candidate emojis are capable of generating animated effects with the original emoji. A candidate emoji is listed higher if it is (1) capable of generating an animated effect per the system design and/or (2) capable of generating an animated effect with the initial emoji that the user is responding to. A candidate emoji is listed lower if it is (1) not capable of generating an animated effect per the system design and/or (2) not capable of generating an animated effect with the initial emoji that the user is responding to. In another example, an initial emoji may be in the form of a wine glass. In response to that wine glass emoji, a recommendation may include: another wine glass; when the suggested emoji is used, the two wine glasses will present an animation of toasting. In some embodiments, certain messaging applications or system functions can provide a list of suggested emojis whenever a reply function is activated. In addition, the suggested emojis may be based on the contents of the message that is being replied to.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
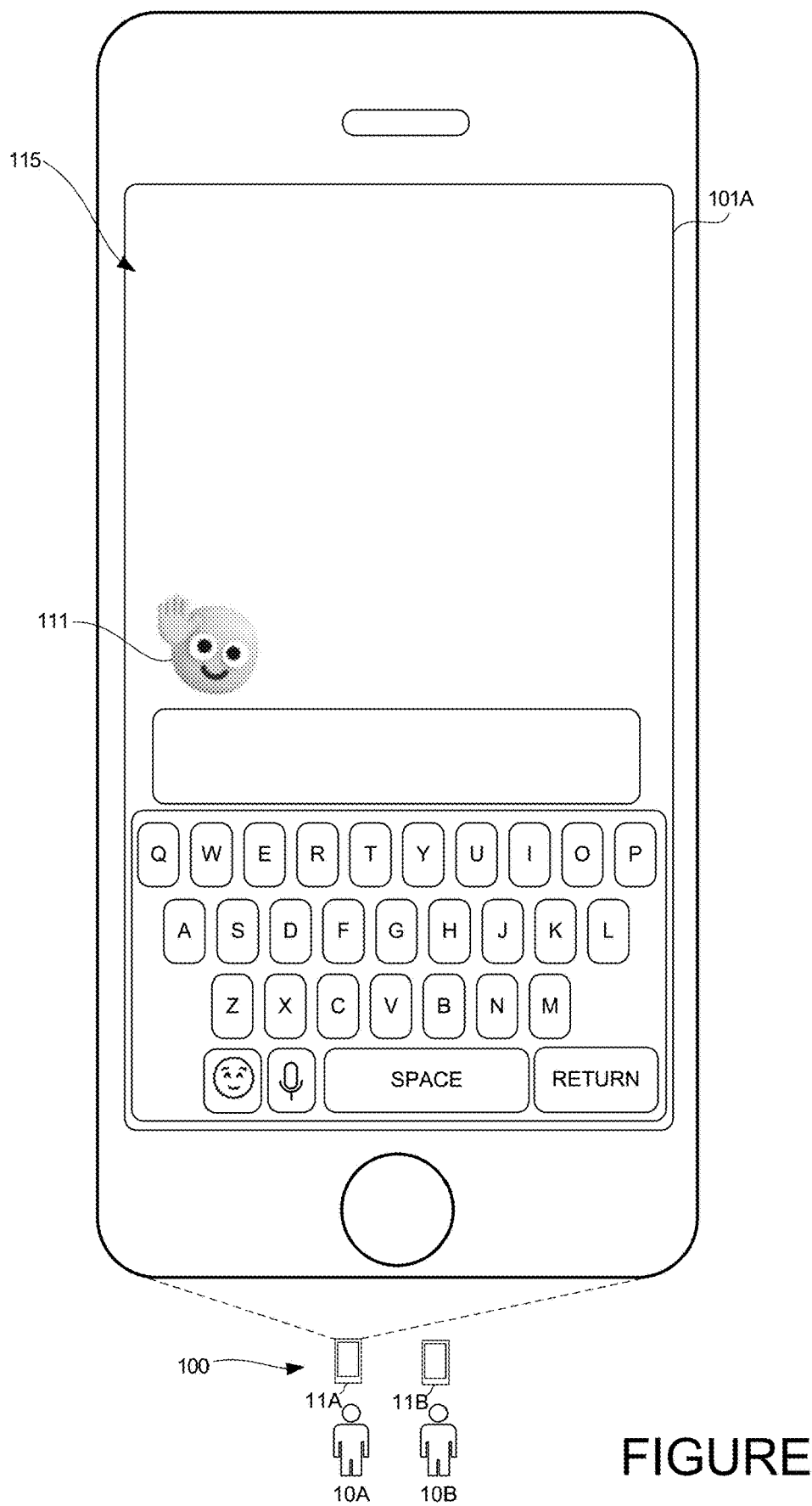
FIG. 1A shows a first state of a user interface arrangement displayed to a first user of an application in communication with a system for generating a list of suggested emojis that are arranged according to a compatibility of candidate emojis capable of generating animated effects with an original incoming emoji and/or capable of generating an animated effect per the system design.
Figure 8:
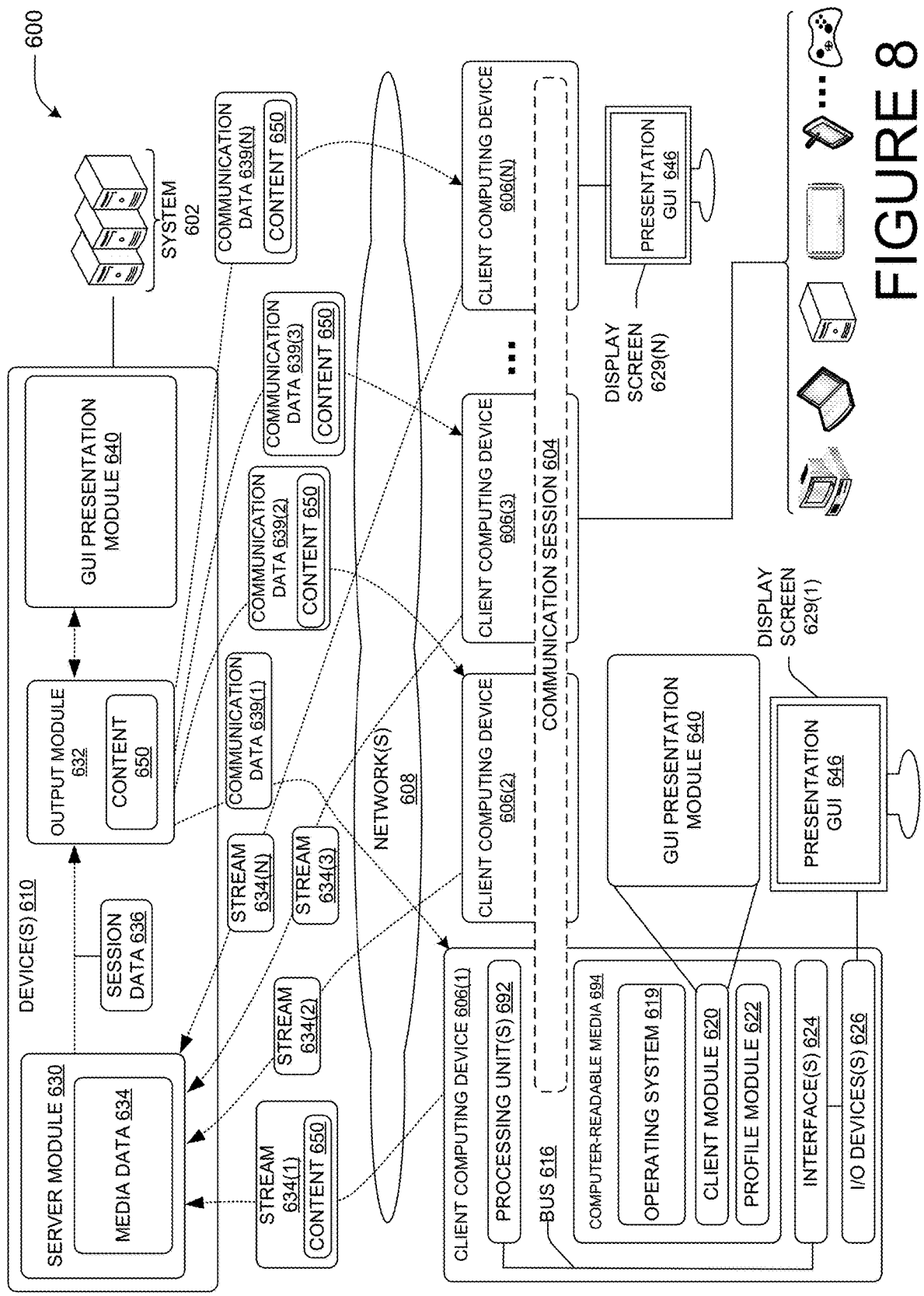
FIG. 8 is a diagram illustrating a distributed computing environment capable of implementing aspects of the techniques and technologies presented herein.
Figure 9:
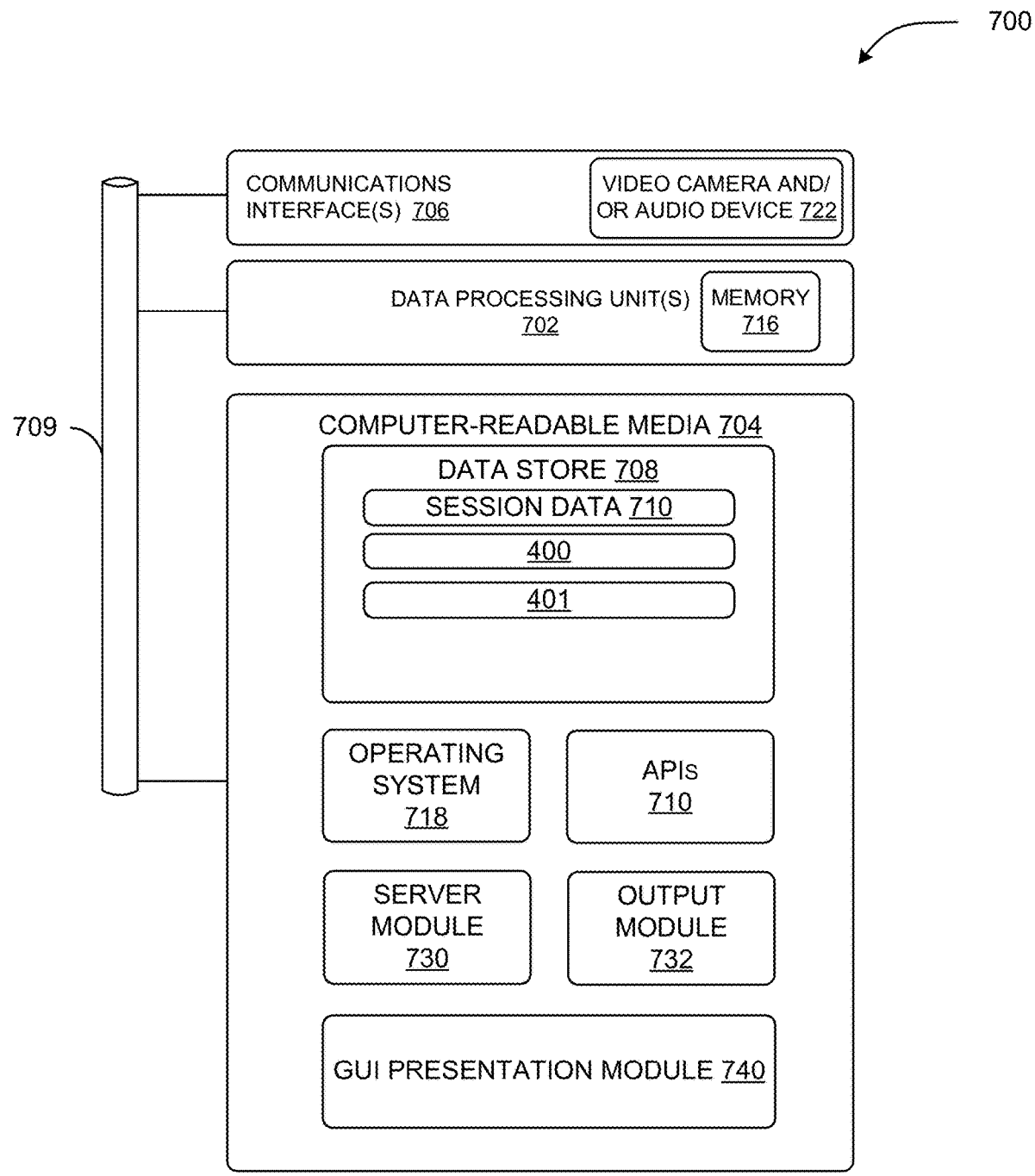
FIG. 9 is a computer architecture diagram illustrating a computing device architecture for a computing device capable of implementing aspects of the techniques and technologies presented herein.

FIG. 1A illustrates a system 100 that provides a user interface having suggested emojis that are arranged in a way that candidate emojis capable of generating animation effects in combination with the received emoji, are listed higher in ranking, e.g., preceding, over other candidate emojis that cannot generate animation effects in combination with the received emoji. The system 100 can include a number of computers 11 each corresponding to individual users 10. For illustrative purposes, a first user 10A, named Miguel Silva, is associated with a first computer 11A and a second user 10B, named Lee Smith, is associated with a second computer 11B. These users can also be respectively referred to as "User A," User B," etc. The computers 11 can be in the form of desktop computers, head-mounted display units, tablets, mobile phones, etc. Additional details of the system 100 are also shown in FIG. 8 and FIG. 9 and also referred to herein as an environment 600.

The following description, in conjunction with FIGS. 1A-1D, illustrates a process where an incoming emoji is posted to a thread, and in response, the system generates an ordered list of reply candidates based on the incoming emoji. The ordered list of reply candidates is displayed to a first user. The first user then selects one of the reply candidates, and in response, the selected candidate causes the display of an animated emoji based on the incoming emoji and the selected candidate.

The process starts at FIG. 1A where an incoming message with an original emoji, e.g., an original expressive illustration 111, is received at a computer 11A of the first user 10A. The system can cause a display of the original expressive illustration 111 in a message thread 115 on a user interface 101A of a first computing device 11A of a first user 10A. In this example, the original expressive illustration 111 is sent from a second computing device 11B of a second user 10B.

Figure 1B:
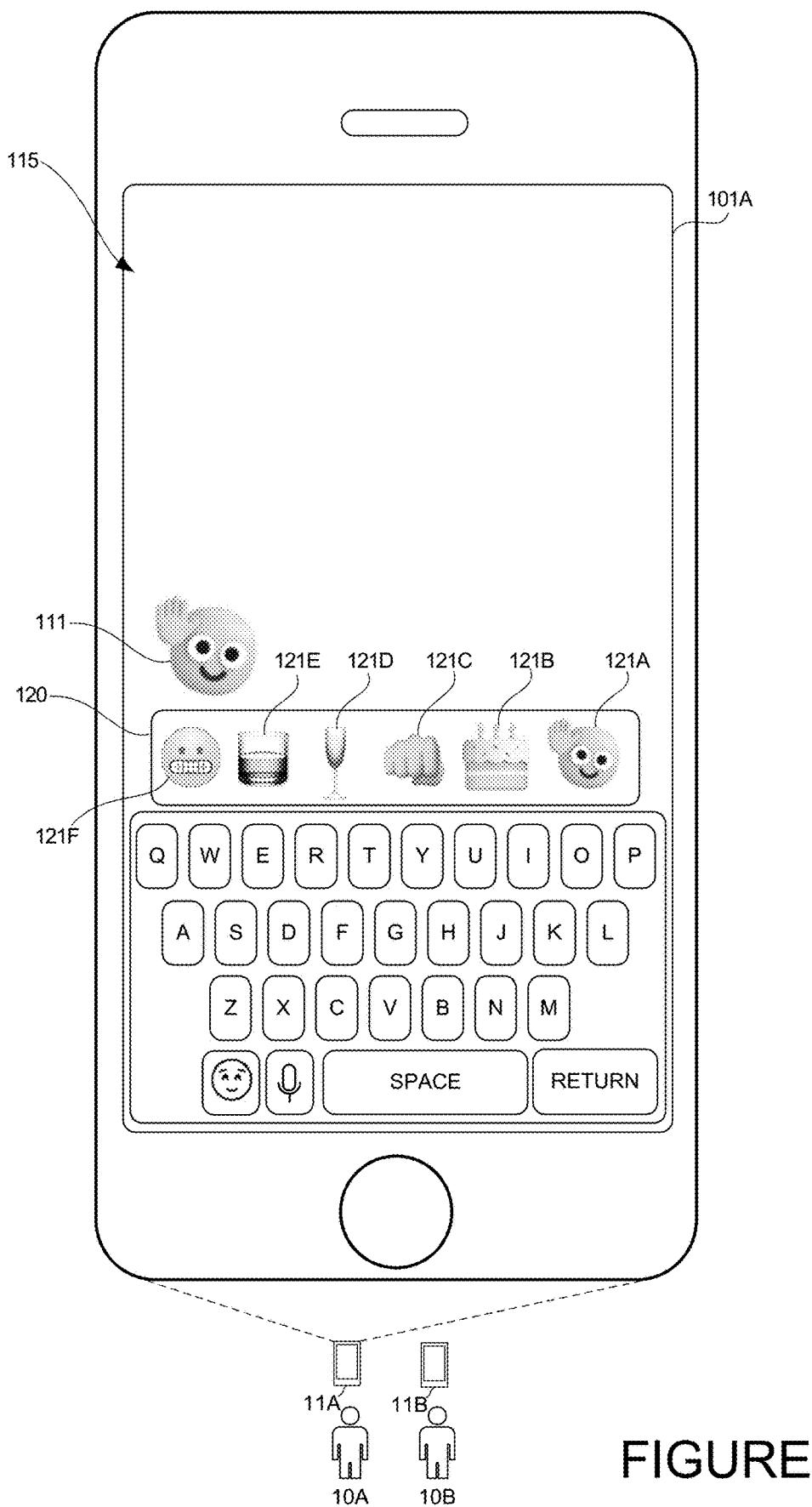
FIG. 1B shows a second state of a user interface arrangement displayed to a first user of an application in communication with a system for generating a list of suggested emojis that are arranged according to a compatibility of candidate emojis capable of generating animated effects with an original incoming emoji and/or capable of generating an animated effect per the system design.

FIG. 1B shows a state of the first computer 11A where an ordered list 120 of reply candidates 121 is displayed on the first computer 11A of the first user 10A. In the ordered list, a candidate emoji is listed higher if it is capable of generating an animated effects per system design and/or capable of generating an animated effects with the initial emoji (the "original expressive illustration 111") that the user is responding to. In some embodiments, the system can generate a list 120 of one or more candidate expressive illustrations 121, wherein an order of the list 120 is based on an animation compatibility for each of the one or more candidate expressive illustrations 121. In this example, a first candidate expressive illustration 121A and a second candidate expressive illustration 121B are ranked higher than the third candidate expressive illustration 121C, the fourth candidate expressive illustration 121D, a fifth candidate expressive illustration 121E, and a sixth candidate expressive illustration 121F because the first candidate expressive illustration 121A and a second candidate expressive illustration 121B are capable of generating animated effects with the original expressive illustration 111, and the other expressive illustrations (121C-121F) are not capable of generating animated effects with the original expressive illustration 111.

In some embodiments, the animation compatibility between two expressive illustrations is based on one or more detected interactions between an individual candidate expressive illustration and the original expressive illustration 111. For example, in detecting an interaction, a system can examine the first candidate expressive illustration ("first candidate emoji 121A") and the original expressive illustration 111 ("original emoji 111") and detect existing expressive illustrations, e.g., accessible emojis having an animation, that contain objects that represent each of the first candidate expressive illustration 121A and the original expressive illustration 111. If the system detects one or more existing expressive illustrations that contain objects that represent each of the first candidate expressive illustration 121A and the original expressive illustration 111, the system determines that the first candidate expressive illustration 121A is capable of generating animation effects with the original expressive illustration 111. However, if the system does not identify at least one existing expressive illustration that contain objects that represent each of the first candidate expressive illustration 121A and the original expressive illustration 111, the system determines that the first candidate expressive illustration 121A is not capable of generating animation effects with the original expressive illustration 111.

In the example of FIG. 1B, the first candidate expressive illustration 121A and the second candidate expressive illustration 121B are determined as being capable of generating animation effects with the original expressive illustration 111, thus the system lists them first on the list. The other emojis (121C-121F) that are not capable of generating animation effects with the original expressive illustration 111 are designated as a lower priority, e.g., they are listed lower on the list. Although the list positions the first emoji, e.g., the highest-ranking emoji, on the left, it can be appreciated that the list can start on any side of the rendering, including the right side. In this example, the first emoji is on the left side in response to determining that the user is a right-handed user, which enables the user to more immediately select the first option. The list can position the first emoji on the left side of the user interface for left-handed users. The user preferences can be modified to change this arrangement. As will be described in more detail below, other factors are also used to determine if a particular candidate expressive illustration ("emoji candidate 121") is capable of generating animation effects with the original emoji 111.

Figure 1C:
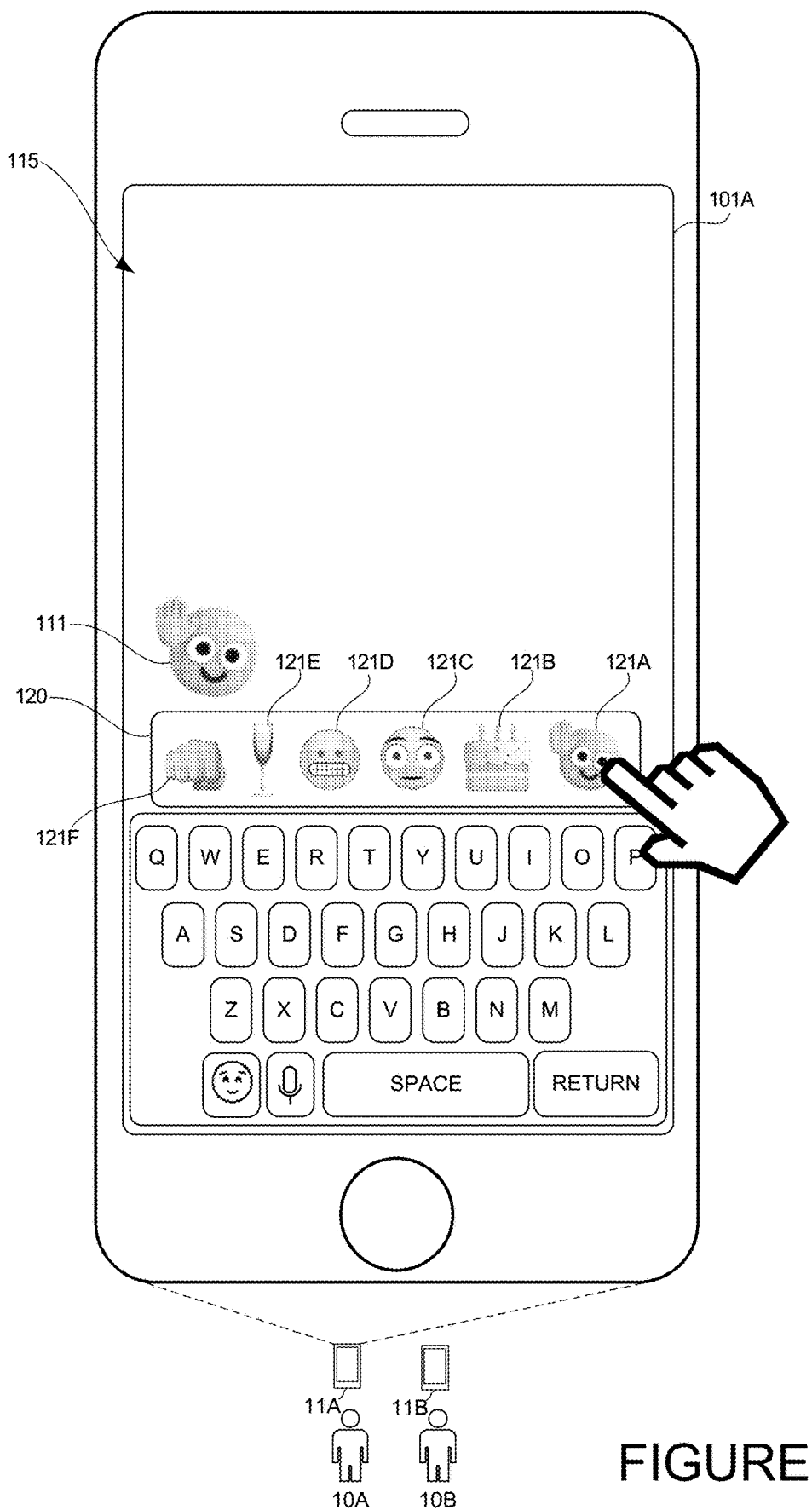
FIG. 1C shows a third state of a user interface arrangement displayed to a first user of an application in communication with a system for generating a list of suggested emojis that are arranged according to a compatibility of candidate emojis capable of generating animated effects with an original incoming emoji and/or capable of generating an animated effect per the system design.

FIG. 1C shows a state of the first computer 11A where an input provided by the first user 10A indicates a selection of a particular candidate emoji, which in this example is the first candidate emoji 121A. In this scenario, the selection of the first candidate emoji 121A causes a display of the existing expressive illustration that corresponds with the first candidate emoji 121A. For illustrative purposes, if the user were to select another emoji candidate that is not capable of generating animation effects with the original expressive illustration 111, such as the third emoji candidate 121C, the system would directly display the third emoji candidate 121C and not a corresponding existing expressive illustration.

Figure 1D:
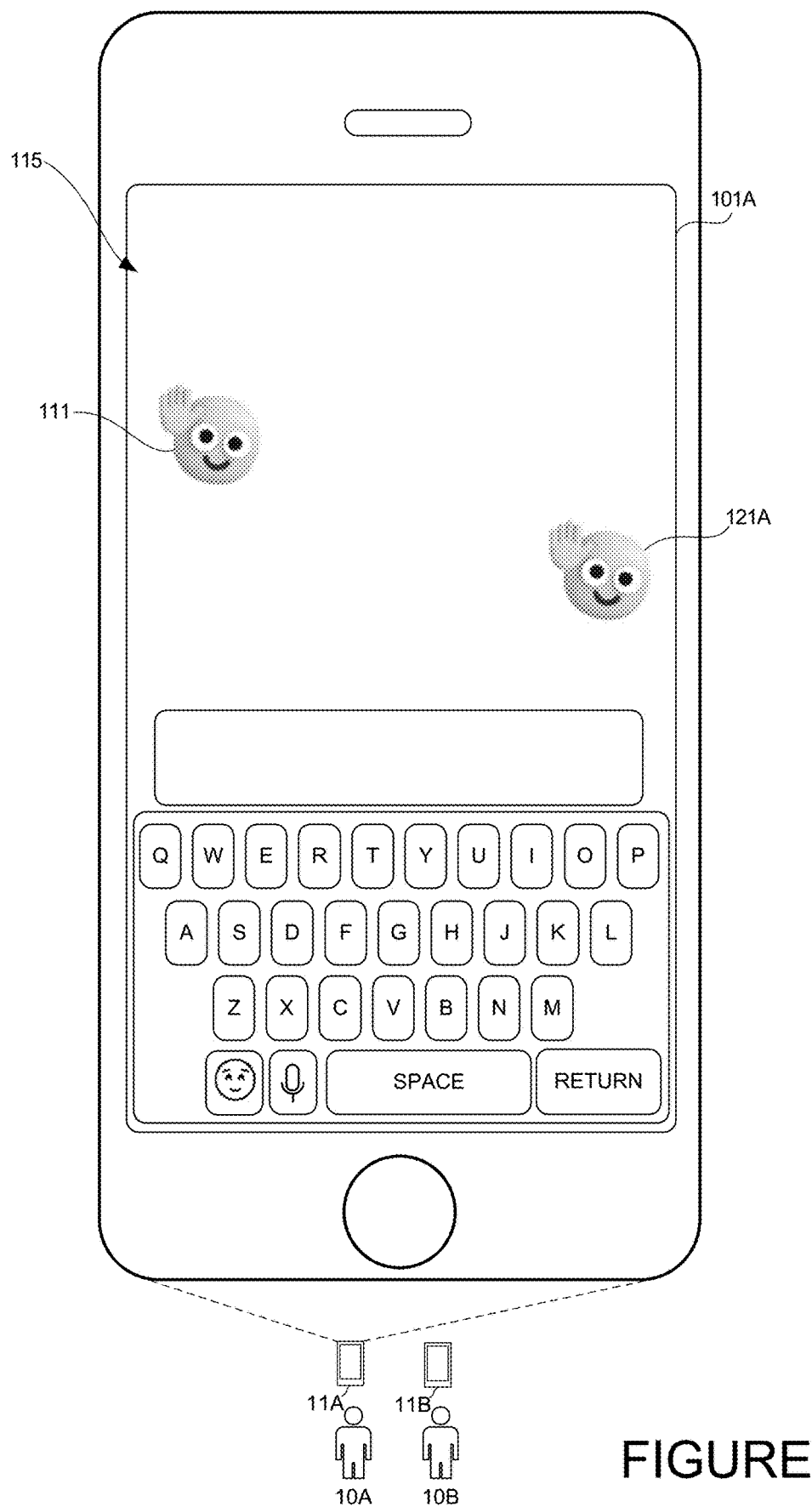
FIG. 1D shows a fourth state of a user interface arrangement displayed to a first user of an application in communication with a system for generating a list of suggested emojis that are arranged according to a compatibility of candidate emojis capable of generating animated effects with an original incoming emoji and/or capable of generating an animated effect per the system design.
Figure 1E:
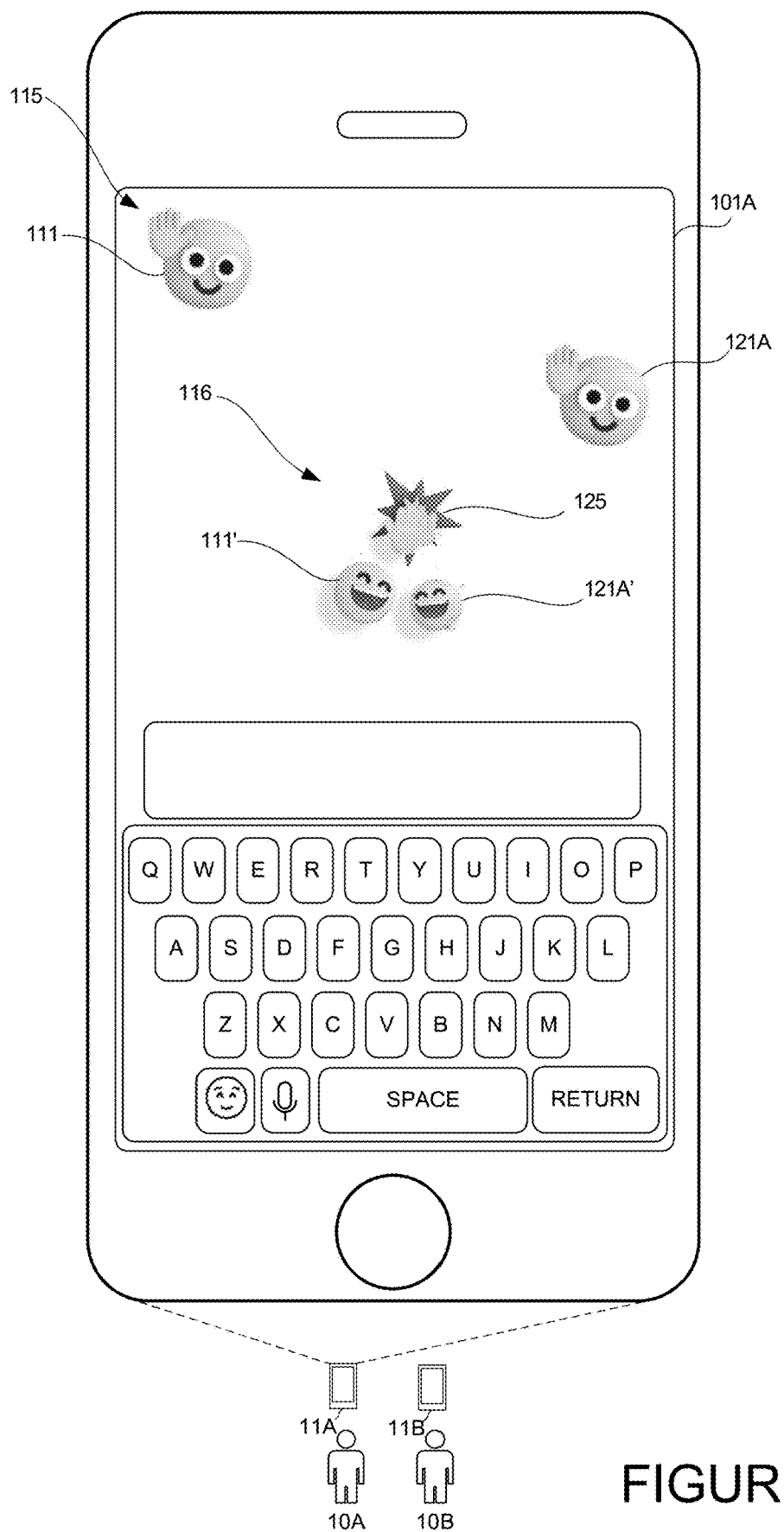
FIG. 1E shows a fifth state of a user interface arrangement displayed to a first user used of an application in communication with a system for generating a list of suggested emojis that are arranged according to a compatibility of candidate emojis capable of generating animated effects with an original incoming emoji and/or capable of generating an animated effect per the system design.

FIG. 1D shows a state of the first computer 11A where the thread is updated based on the user selection of a candidate emoji from the ordered list of candidate emojis. In this particular example, the first candidate emoji 121A was selected by the first user. In response, the first candidate emoji 121A that was selected by the first user is displayed to the thread 115. In this particular example, the first candidate emoji 121A was selected by the first user of the first computing device 11A. Then after the display of the first candidate emoji 121A, as shown in FIG. 1E, the system causes the thread 115 to automatically transition from the display of the first candidate emoji 121A to also displaying an animated emoji 116 that includes a representation of the incoming emoji 111' and a representation of the candidate emoji 121A' that was selected by the first user. In this example, the animated emoji 116 illustrates a representation of activity 125 between the representation of the candidate emoji 121A' and the representation of the incoming emoji 111', e.g., such as the action of two entities performing a high five. The animation emoji can be a static animation or the animation emoji can be a multi-frame animation showing a motion of hands coming together to make contact with one another, or show other types of motion.

Figure 2A:
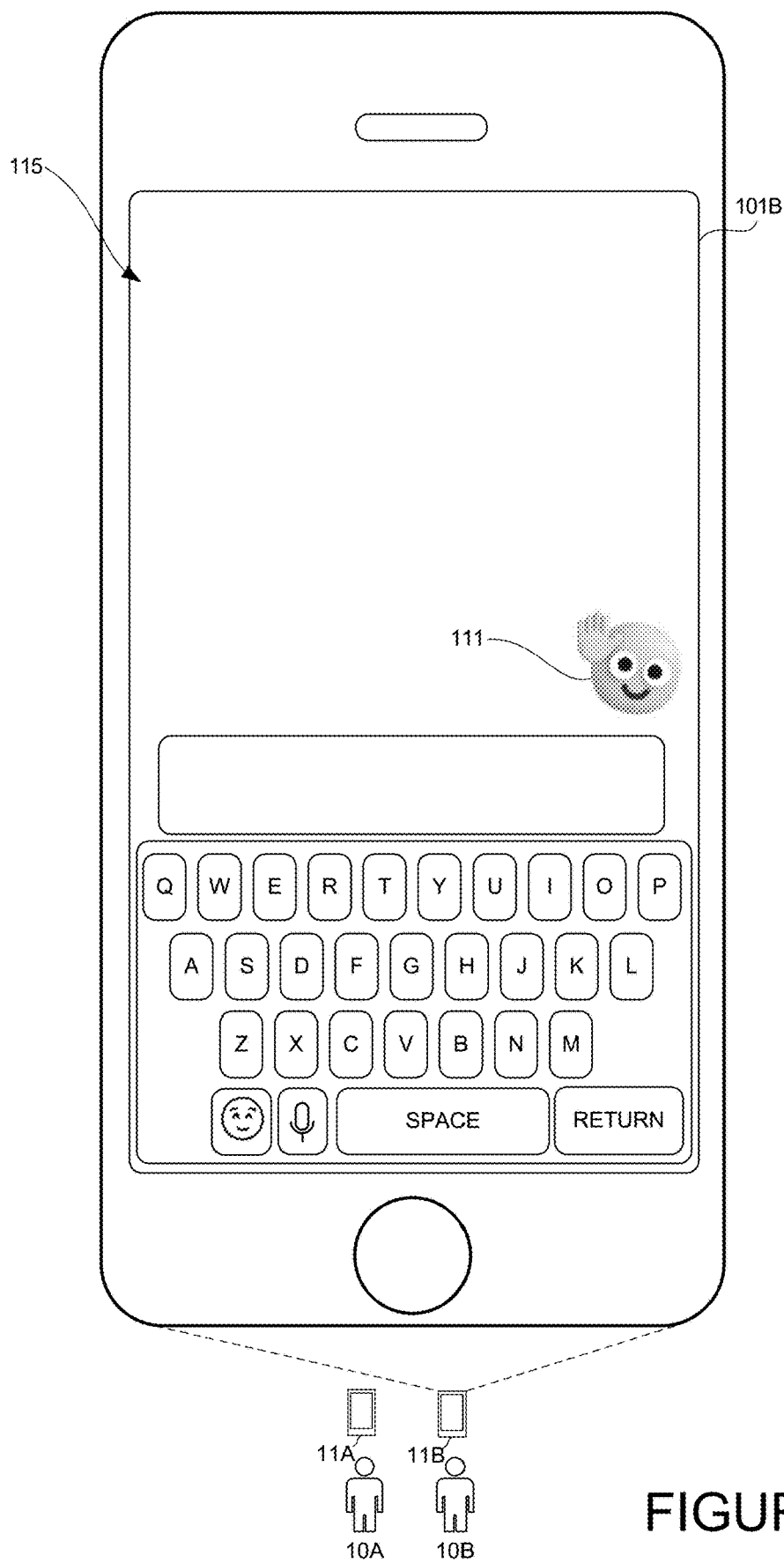
FIG. 2A shows a first state of a user interface arrangement displayed to a second user of an application in communication with a system used for generating a list of suggested emojis that are arranged according to a compatibility of candidate emojis capable of generating animated effects with an original incoming emoji and/or capable of generating an animated effect per the system design.
Figure 2B:
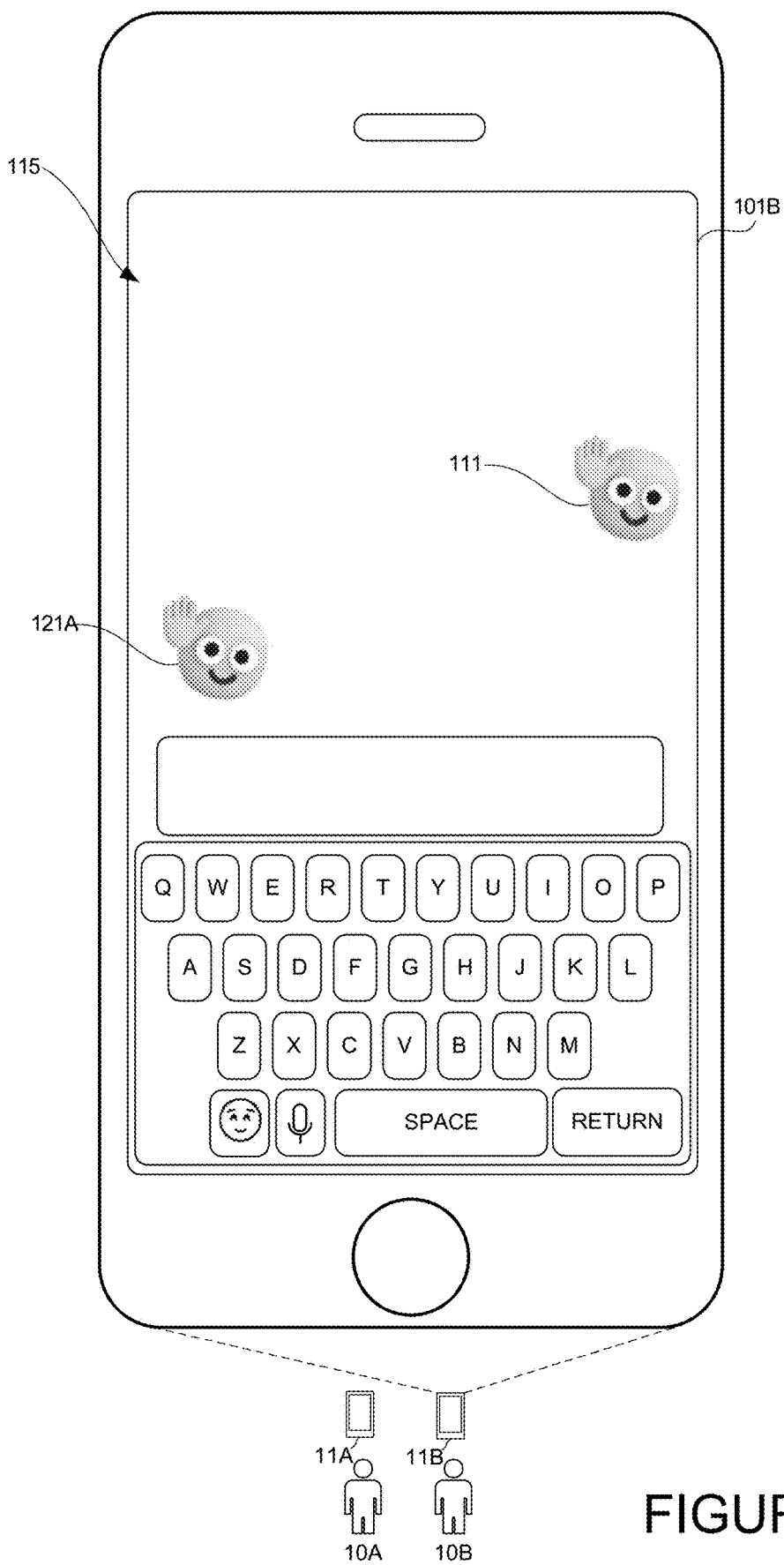
FIG. 2B shows a second state of a user interface arrangement displayed to a second user of an application in communication with a system used for generating a list of suggested emojis that are arranged according to a compatibility of candidate emojis capable of generating animated effects with an original incoming emoji and/or capable of generating an animated effect per the system design.
Figure 2C:
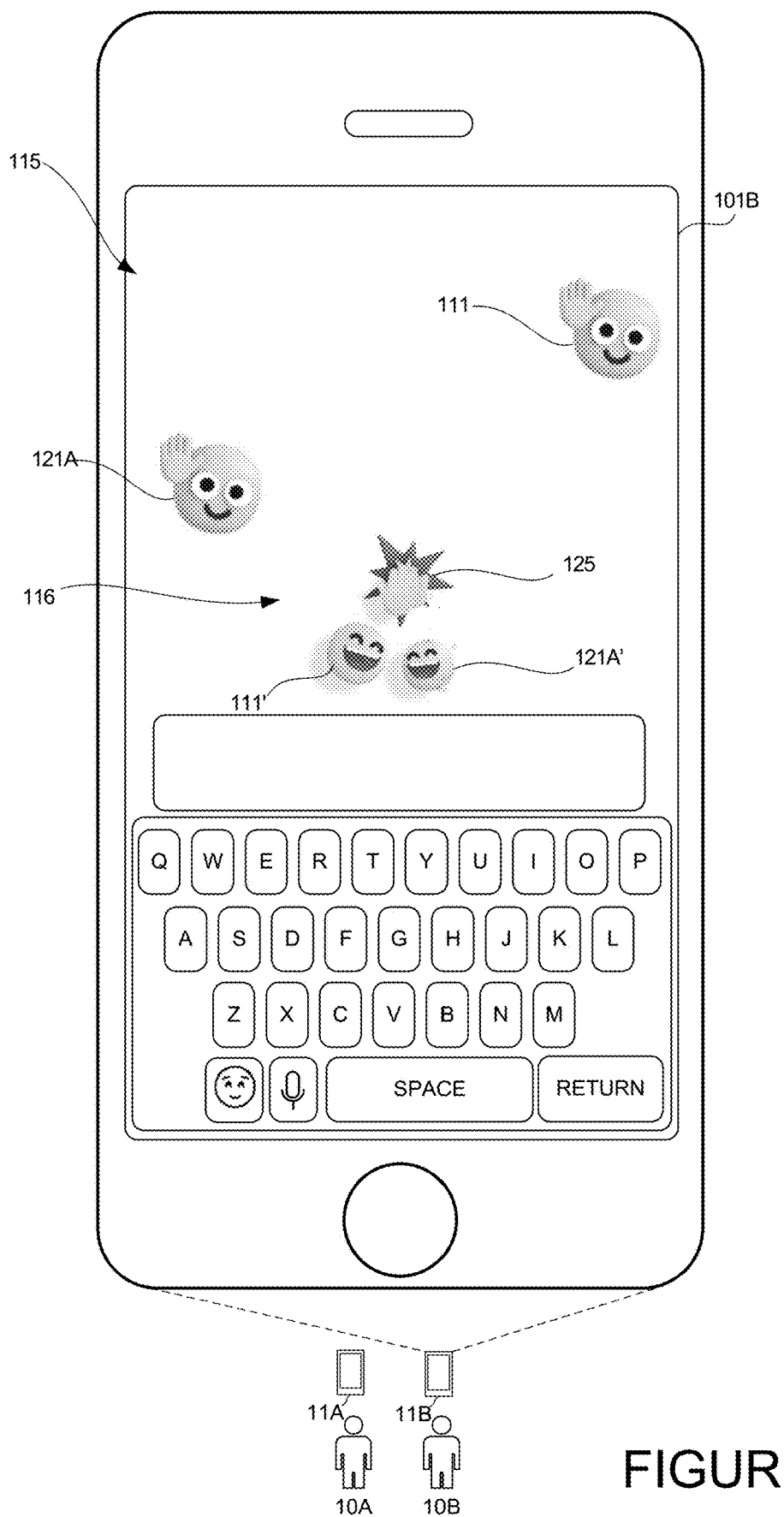
FIG. 2C shows a third state of a user interface arrangement displayed to a second user of an application in communication with a system used for generating a list of suggested emojis that are arranged according to a compatibility of candidate emojis capable of generating animated effects with an original incoming emoji and/or capable of generating an animated effect per the system design.

FIGS. 2A-2C illustrate the above-described process from the perspective of the display screen of the second computer 11B of the second user 10B. As shown in FIG. 2A, the second computer 11B displays a second user interface arrangement 101B. In response to the second user selecting the original emoji 111 by an input received at the second computer 11B, the original emoji 111 is displayed to the thread 115 on the second computer 11B.

FIG. 2B shows a state of the second computer 11B where the thread is updated based on the first user's selection of the candidate emoji 121A from the ordered list of candidate emojis that is displayed on the first computer 11A. The candidate emoji 121A is shown in the thread as a reply to the original emoji. Then, as shown in FIG. 2C, the second computer 11B automatically updates the thread 115 and displays the animated emoji 116 that includes a representation of the incoming emoji 111' and a representation of the candidate emoji 121A'. This automatic update is also displayed in response to the user input at the first computing device 11A selecting the first candidate emoji 121A. In this example, the animated emoji 116 illustrates a representation of activity 125 between the representation of the candidate emoji 121A' and the representation of the incoming emoji 111', e.g., such as the action of two entities performing a high five.

Figure 3A:
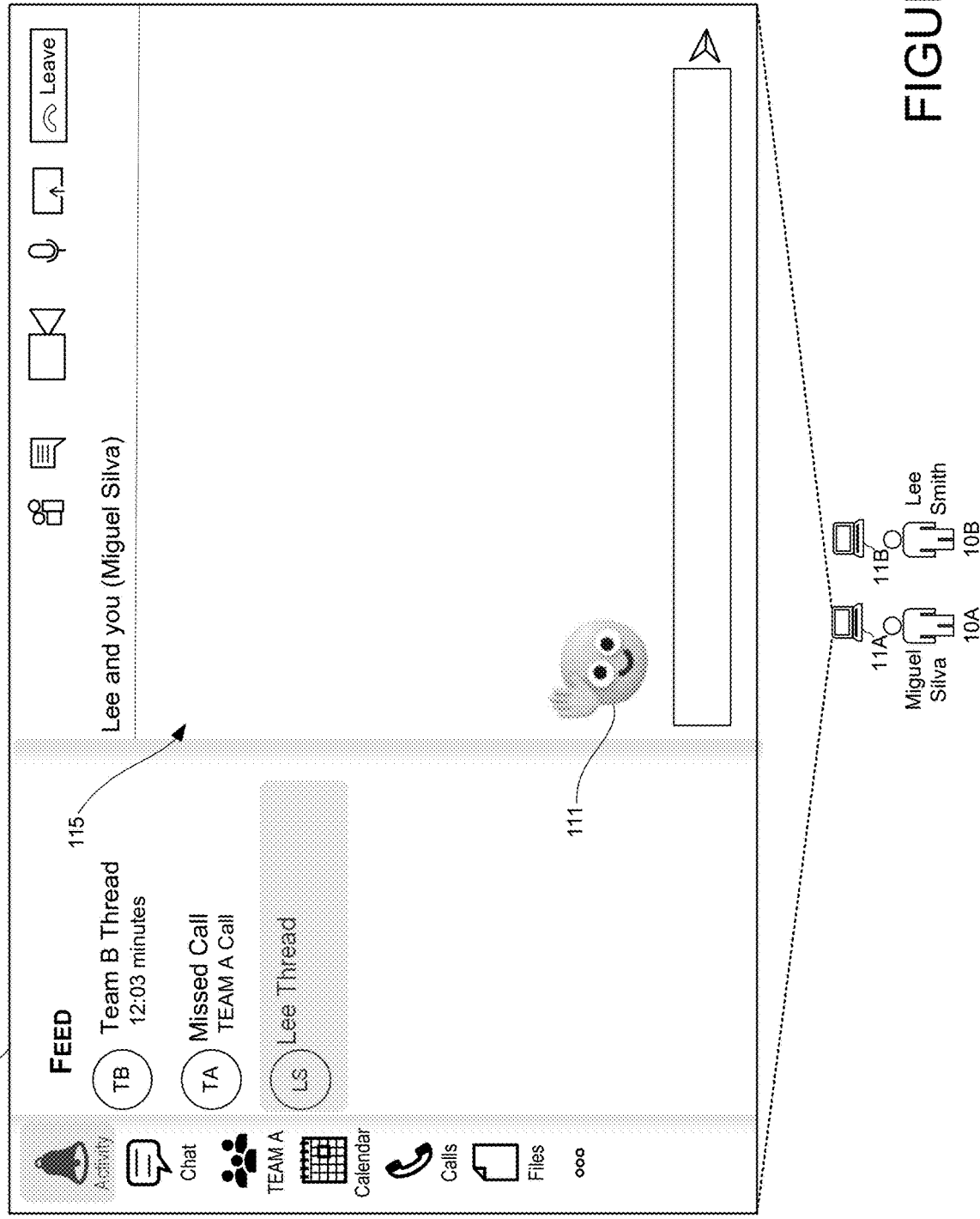
FIG. 3A shows a first state of a user interface arrangement displayed to a first user using a desktop application in communication with a system used for generating a list of suggested emojis that are arranged according to a compatibility of candidate emojis capable of generating animated effects with an original incoming emoji and/or capable of generating an animated effect per the system design.
Figure 3B:
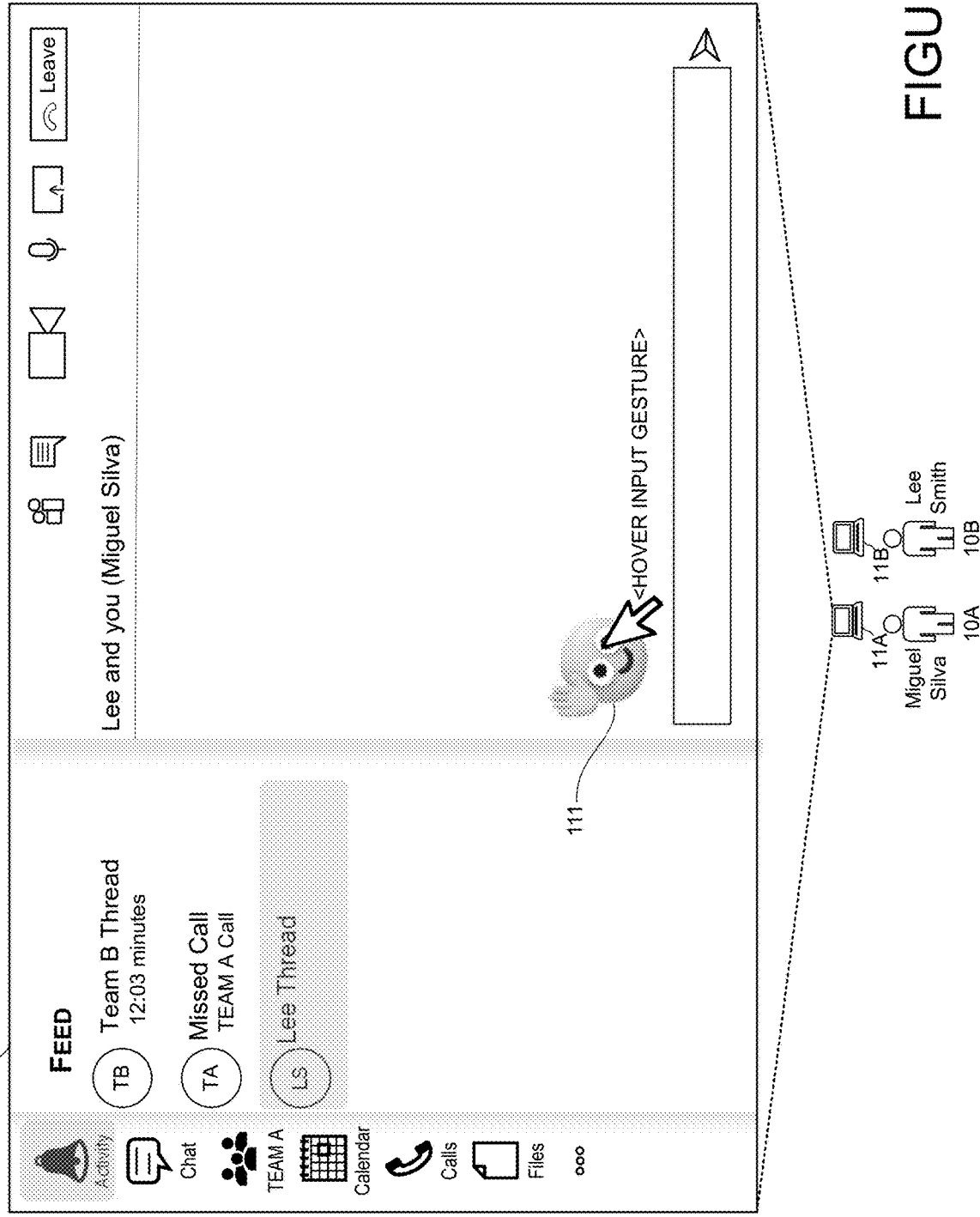
FIG. 3B shows a second state of a user interface arrangement displayed to a first user of a desktop application in communication with a system used for generating a list of suggested emojis that are arranged according to a compatibility of candidate emojis capable of generating animated effects with an original incoming emoji.
Figure 3C:
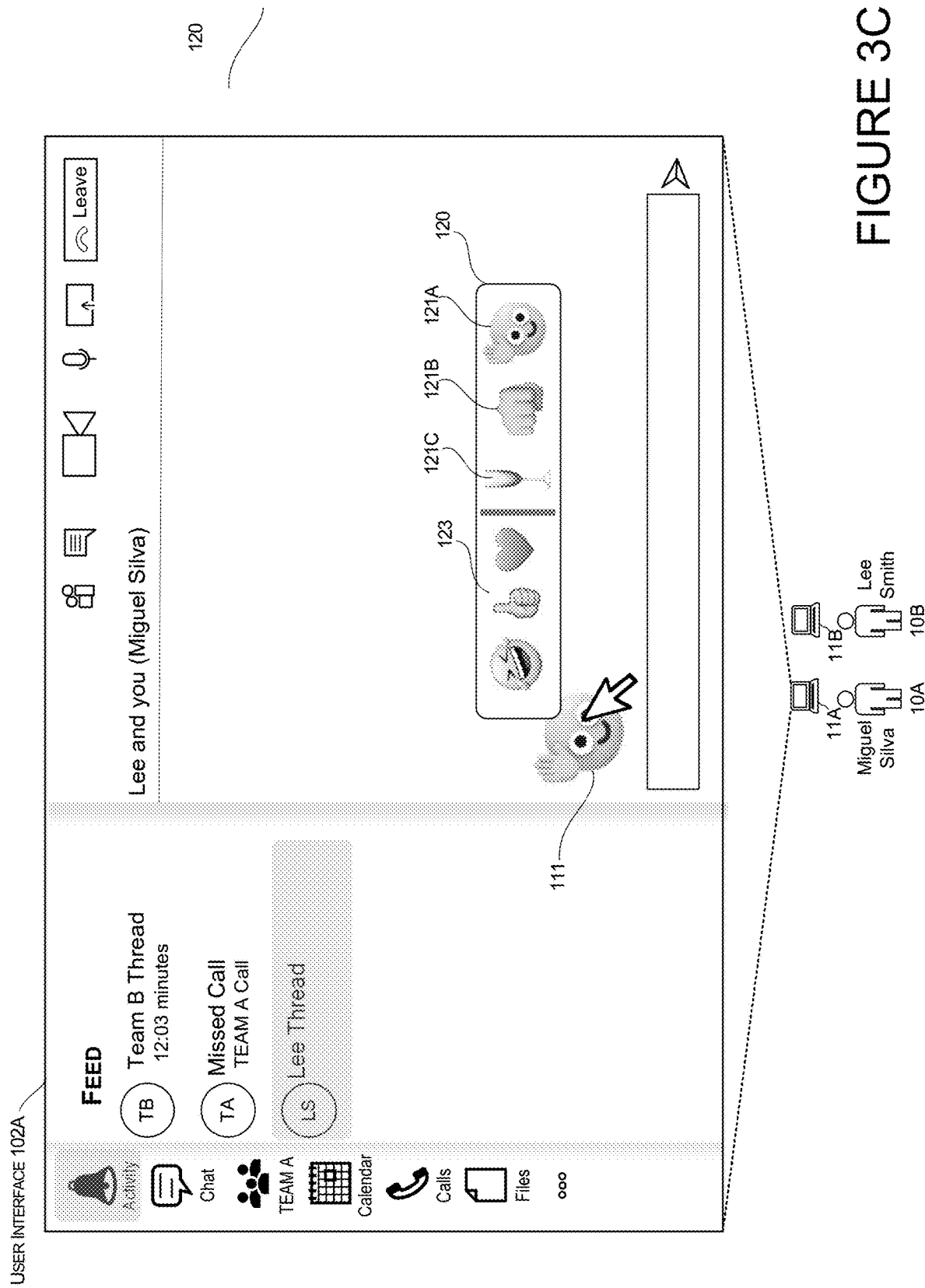
FIG. 3C shows a third state of a user interface arrangement displayed to a first user of a desktop application in communication with a system used for generating a list of suggested emojis that are arranged according to a compatibility of candidate emojis capable of generating animated effects with an original incoming emoji.

In some configurations, the system can also display an ordered list of emoji candidates in response to a predetermined input, such as a hover. FIGS. 3A-3F show an example of this feature. In this example, each user is communicating using an application that can manage a chat thread. This application can include applications such as TEAMS, SLACK, GOOGLE HANGOUTS, etc. The process starts at FIG. 3A where an incoming message with an original emoji, e.g., an original expressive illustration 111, is received at a computer 11A of the first user 10A. The system can cause a display of the original expressive illustration 111 in a message thread 115 on a user interface 102A of a first computing device 11A of a first user 10A. In this example, the original expressive illustration 111 is sent from a second computing device 11B of a second user 10B. In FIG. 3B, the first computer 11A receives a predetermined input in association with the displayed emoji 111. In this example, the predetermined input is a gesture where the user hovers over the original emoji 111 using a pointing device. FIG. 3C shows a state of the first computer 11A where an ordered list 120 of reply candidates 121 is displayed on the first computer 11A of the first user 10A. In this example, the ordered list 120 is displayed in response to the predetermined input, e.g., the hover. The ordered list 120 is also displayed concurrently with a reaction list 123 of reaction emojis. The reaction list 123 includes a list of reaction emojis that are displayed in association with the original emoji 111 when a reaction emoji is selected. For example, when a user selects the heart emoji, the heart is automatically sent to other users on the thread and the heart is displayed on or near the original emoji 111. When a reaction emoji is selected, a version the reaction emoji having a reduced size is positioned on or near the original emoji 111.

The ordered list 120 comprises candidate emojis that are displayed as replies to the original emoji. Similar to the candidate emoji shown in FIG. 1D, when a user selects a candidate emoji from the ordered list 120 shown in FIG. 3C, the selected candidate emoji is displayed in the thread as a stand-alone message, not displayed on or near the original emoji. In the ordered list shown in FIG. 3C, and in all embodiments described herein, a candidate emoji is listed higher if it is capable of generating an animated effects per system design and/or capable of generating an animated effects with the initial emoji ("original expressive illustration 111" or the "original emoji 111") that the user is responding to. In some embodiments, the system can generate a list 120 of one or more candidate expressive illustrations 121, wherein an order of the list 120 is based on an animation compatibility for each of the one or more candidate expressive illustrations 121. In this example, a first candidate expressive illustration 121A is ranked higher than the other candidate expressive illustrations 121B and 121C because the first candidate expressive illustration 121A is capable of generating animated effects with the original expressive illustration 111, and the other expressive illustrations 121B and 121C are not capable of generating animated effects with the original expressive illustration 111 and/or not capable of generating animated effects per the system design.

As described herein, the animation compatibility between two expressive illustrations is based on one or more detected interactions between an individual candidate expressive illustration and the original expressive illustration 111. For example, in detecting an interaction, a system can examine the first candidate expressive illustration ("first candidate emoji 121A") and the original expressive illustration 111 ("original emoji 111") and detect existing expressive illustrations, e.g., accessible emojis having an animation, that contain objects that represent each of the first candidate expressive illustration 121A and the original expressive illustration 111. If the system detects a threshold number of existing expressive illustrations that contain objects that represent each of the first candidate expressive illustration 121A and the original expressive illustration 111, the system determines that the first candidate expressive illustration 121A is capable of generating animation effects with the original expressive illustration 111. However, if the system does not identify the threshold number of existing expressive illustration that contain objects that represent each of the first candidate expressive illustration 121A and the original expressive illustration 111, the system determines that the first candidate expressive illustration 121A is not capable of generating animation effects with the original expressive illustration 111.

In the example of FIG. 3C, the first candidate expressive illustration 121A is determined as being capable of generating animation effects with the original expressive illustration 111, thus the system lists them first on the list. The other emojis (121B-121C) that are not capable of generating animation effects with the original expressive illustration 111 are designated as a lower priority, e.g., they are listed lower on the list.

Figure 3D:
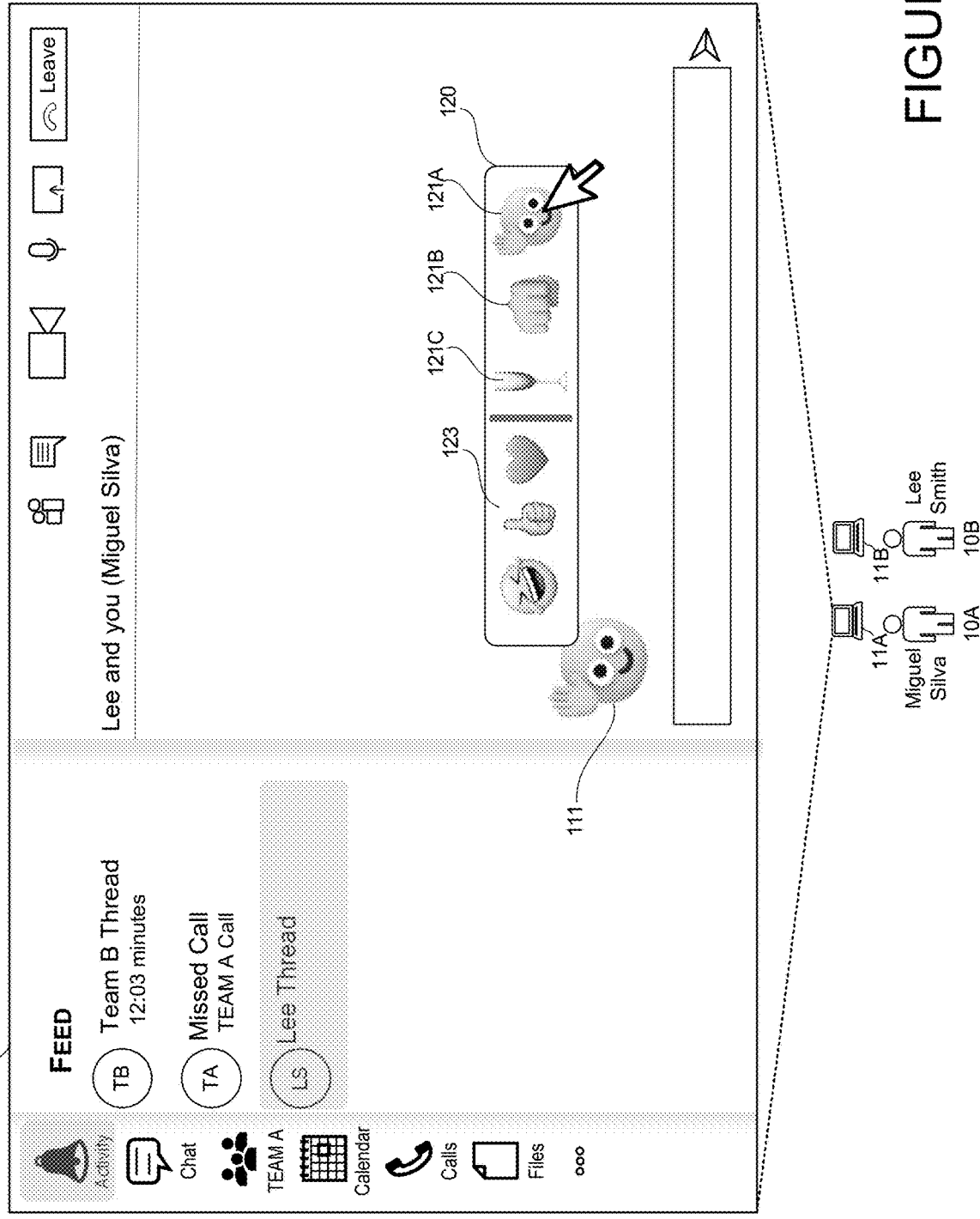
FIG. 3D shows a fourth state of a user interface arrangement displayed to a first user of a desktop application in communication with a system used for generating a list of suggested emojis that are arranged according to a compatibility of candidate emojis capable of generating animated effects with an original incoming emoji.
Figure 3E:
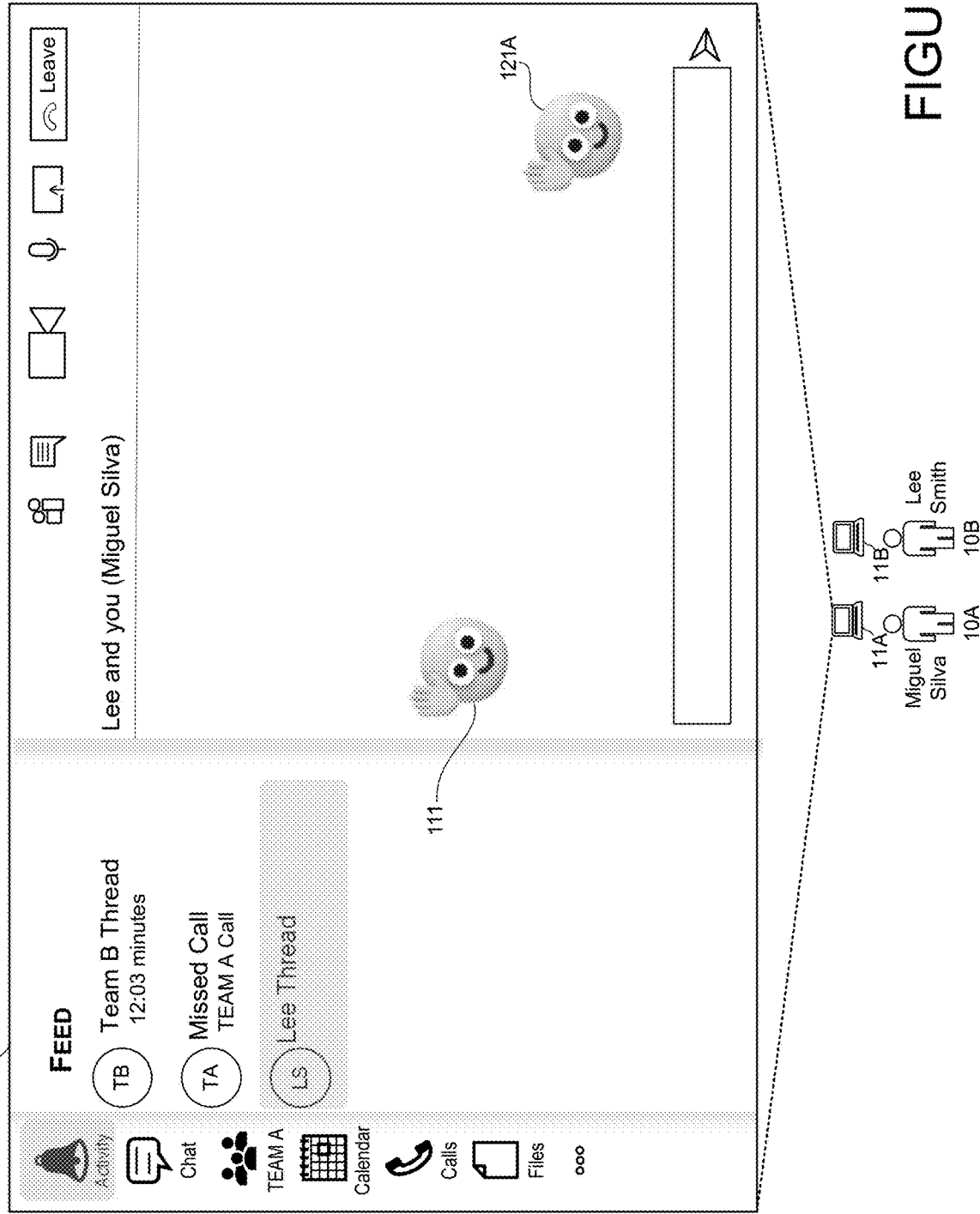
FIG. 3E shows a fifth state of a user interface arrangement displayed to a first user of a desktop application in communication with a system used for generating a list of suggested emojis that are arranged according to a compatibility of candidate emojis capable of generating animated effects with an original incoming emoji.

FIG. 3D shows a state of the first computer 11A where an input provided by the first user 10A indicates a selection of a particular candidate emoji, which in this example is the first candidate emoji 121A. In this scenario, as shown in FIG. 3E, the selection of the first candidate emoji 121A causes a display of the existing expressive illustration that corresponds with the first candidate emoji 121A. For illustrative purposes, if the user were to select another emoji candidate that is not capable of generating animation effects with the original expressive illustration 111, such as the third emoji candidate 121C, the system would directly display the third emoji candidate 121C.

FIG. 3E shows a state of the first computer 11A where the thread is updated based on the user selection of a candidate emoji from the ordered list of candidate emojis. In this particular example, the first candidate emoji 121A was selected by the first user. Thus, in response, the first candidate emoji 121A that was selected by the first user is displayed to the thread 115.

Figure 3F:
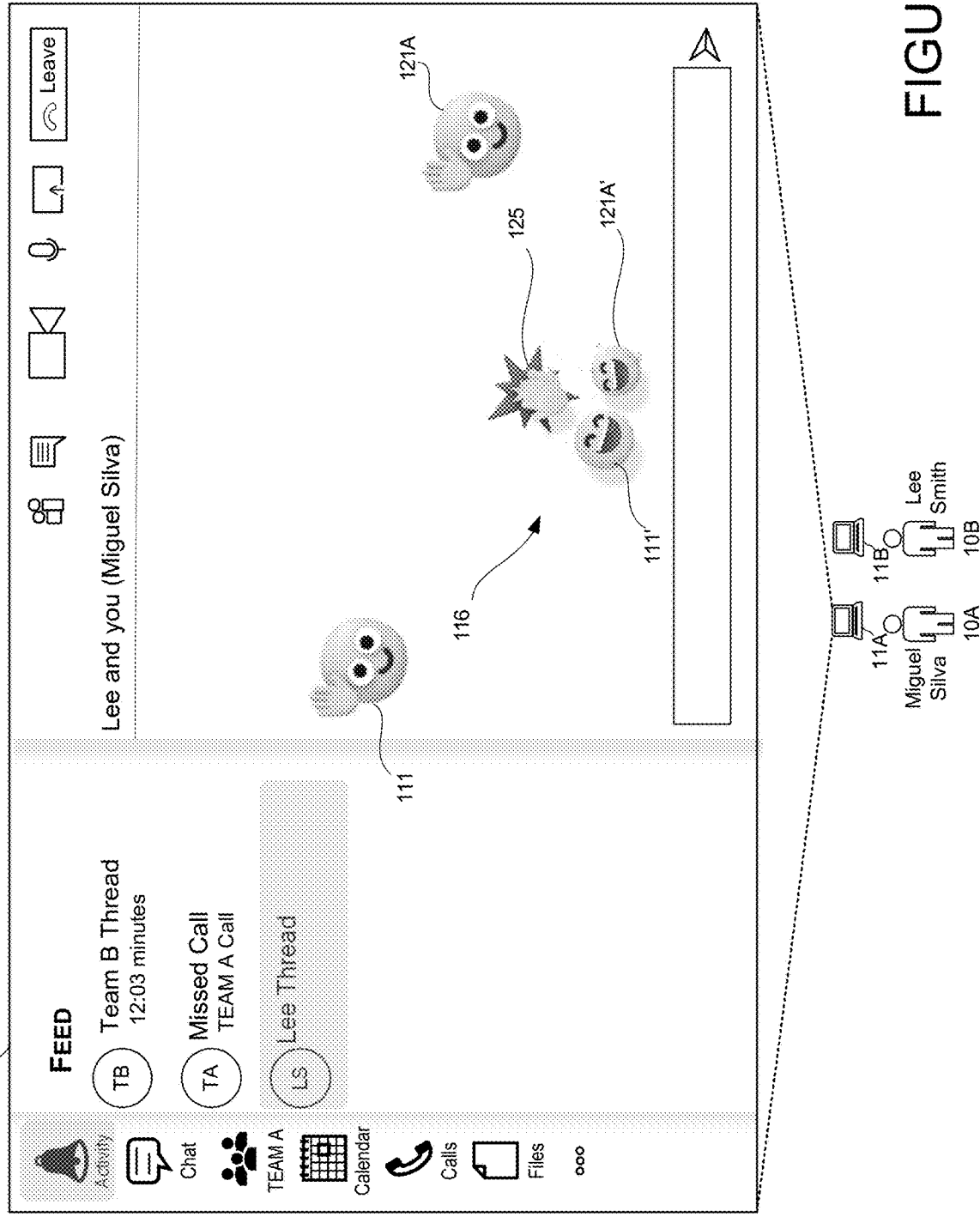
FIG. 3F shows a fifth state of a user interface arrangement displayed to a first user of a desktop application in communication with a system used for generating a list of suggested emojis that are arranged according to a compatibility of candidate emojis capable of generating animated effects with an original incoming emoji.

FIG. 3F shows a state of the system causing the thread 115 to automatically update. In this update, which is in response to the display of the first candidate emoji 121A was selected by the first user, the thread displays an animated emoji 116 that includes a representation of the incoming emoji 111' and a representation of the candidate emoji 121A' that was selected by the first user. In this example, the animated emoji 116 illustrates a representation of activity 125 between the representation of the candidate emoji 121A' and the representation of the incoming emoji 111', e.g., such as the action of two entities performing a high five.

Figure 4A:
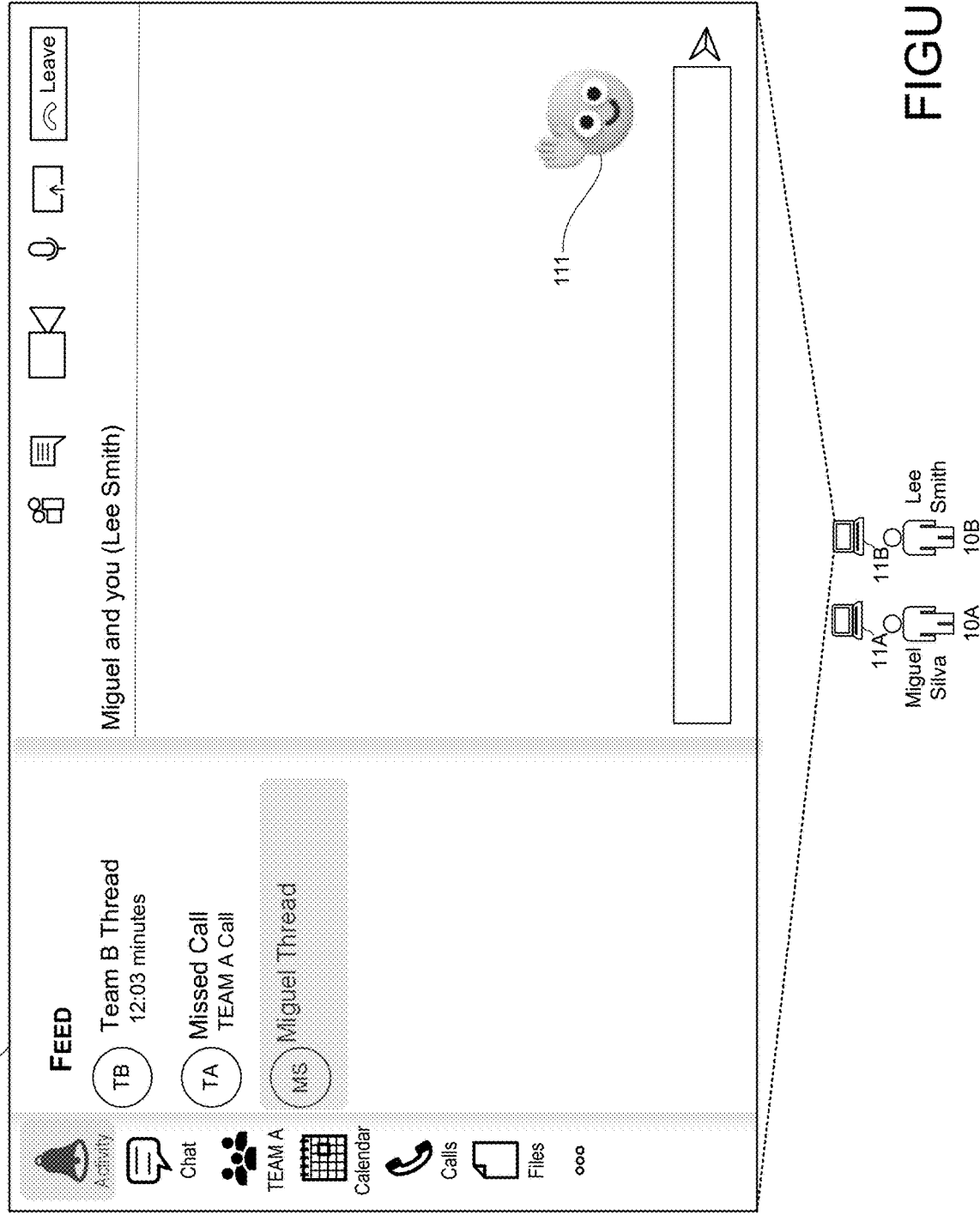
FIG. 4A shows a first state of a user interface arrangement displayed to a second user of a desktop application in communication with a system used for generating a list of suggested emojis that are arranged according to a compatibility of candidate emojis capable of generating animated effects with an original incoming emoji.
Figure 4B:
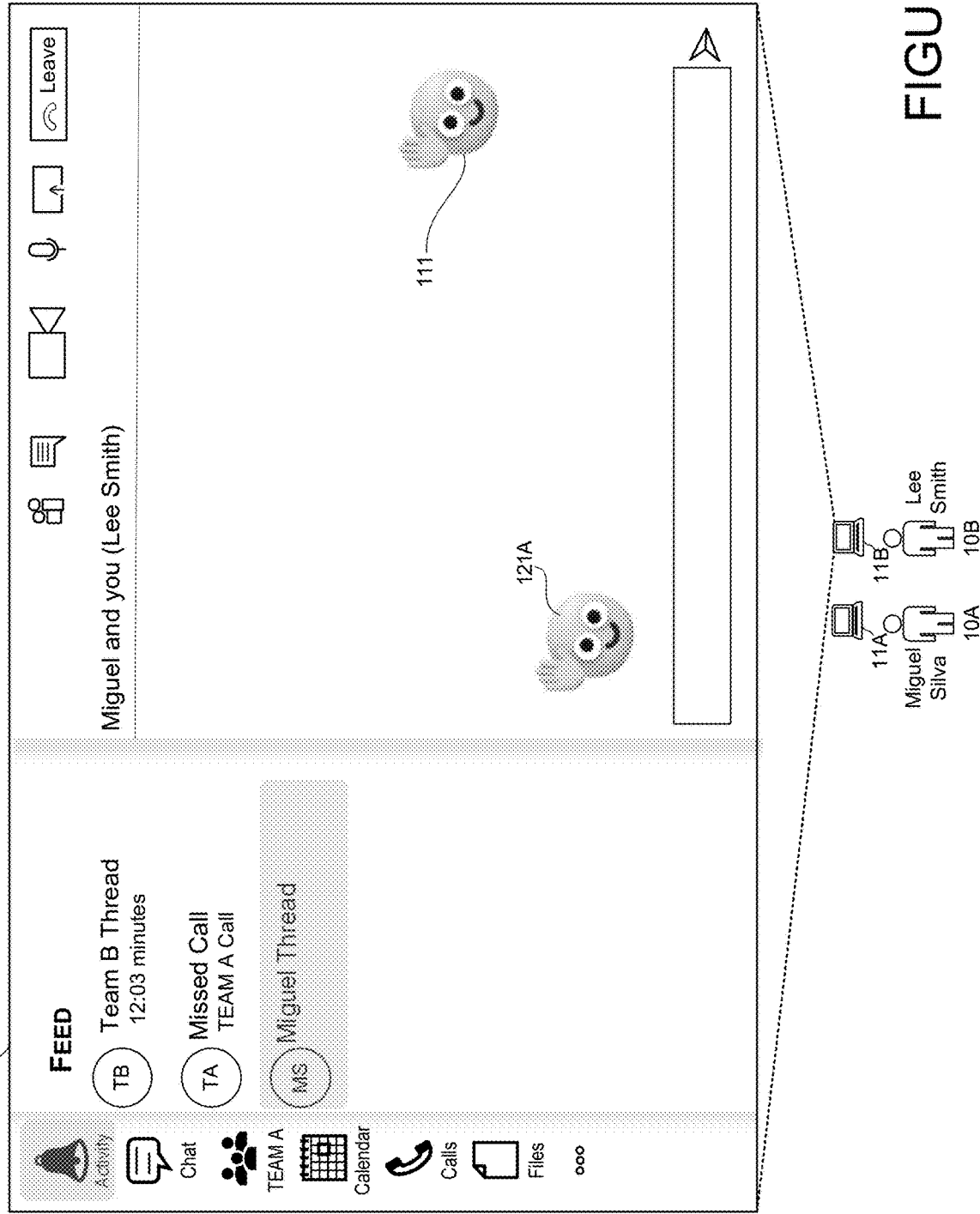
FIG. 4B shows a second state of a user interface arrangement displayed to a second user of a desktop application in communication with a system used for generating a list of suggested emojis that are arranged according to a compatibility of candidate emojis capable of generating animated effects with an original incoming emoji.
Figure 4C:
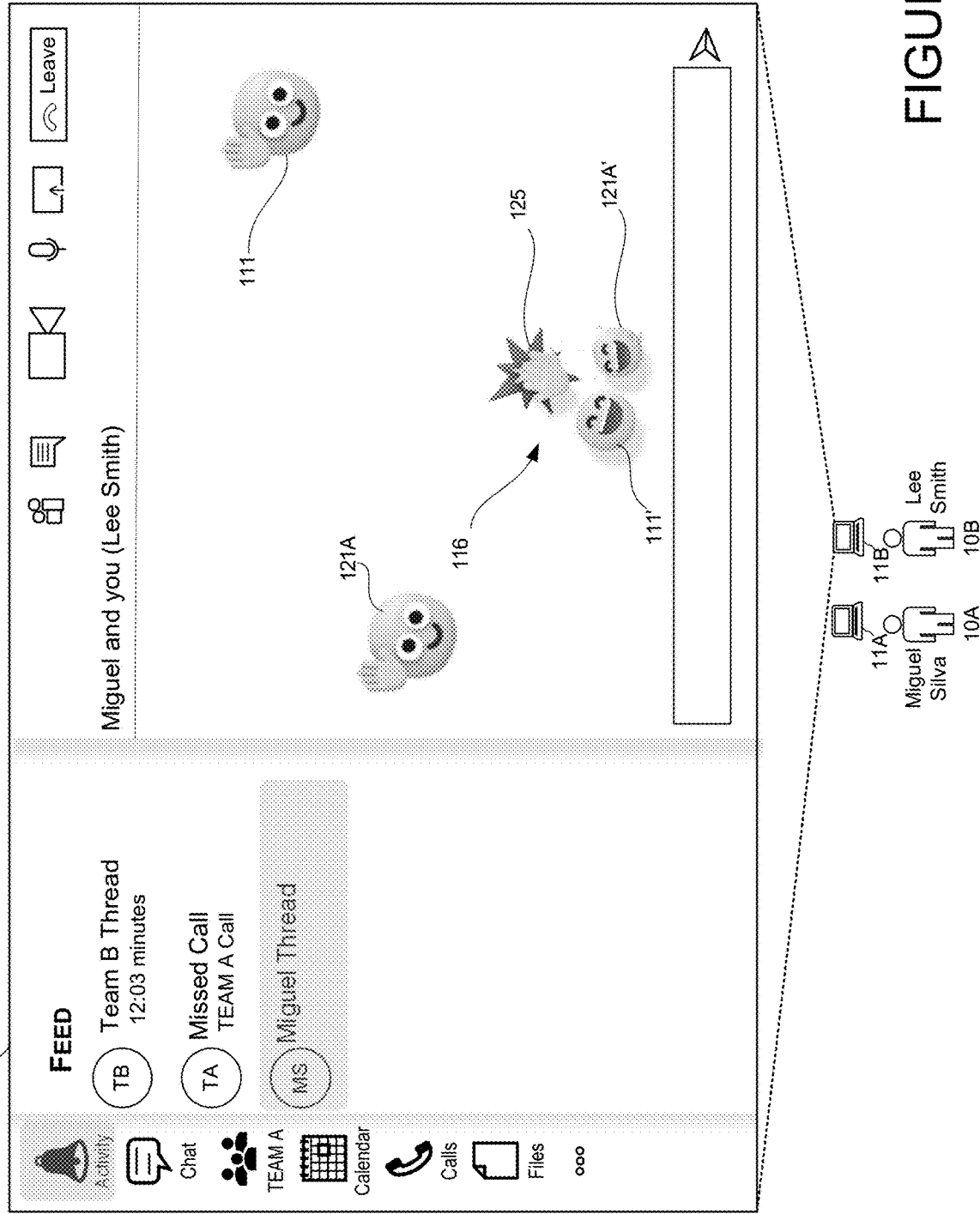
FIG. 4C shows a third state of a user interface arrangement displayed to a second user of a desktop application in communication with a system used for generating a list of suggested emojis that are arranged according to a compatibility of candidate emojis capable of generating animated effects with an original incoming emoji.

FIGS. 4A-4C illustrate the above-described process from the perspective of the display screen of the second computer 11B of the second user 10B. As shown in FIG. 4A, the second computer 11B displays a second user interface arrangement 102B. In response to the second user selecting the original emoji 111 by an input received at the second computer 11B, the original emoji 111 is displayed to the thread 115 on the second computer 11B.

FIG. 4B shows a state of the second computer 11B where the thread is updated based on the first user's selection of the candidate emoji 121A from the ordered list of candidate emojis that is displayed on the first computer 11A. The candidate emoji 121A is shown in the thread as a reply to the original emoji. Then, as shown in FIG. 4C, the second computer 11B automatically updates the thread 115 and displays the animated emoji 116 that includes a representation of the incoming emoji 111' and a representation of the candidate emoji 121A'. This automatic update is also displayed in response to the user input at the first computing device 11A selecting the first candidate emoji 121A. In this example, the animated emoji 116 illustrates a representation of activity 125 between the representation of the candidate emoji 121A' and the representation of the incoming emoji 111', e.g., such as the action of two entities performing a high five.

In the examples described above, the animated emoji 116 illustrates a representation of activity 123 between the representation of the candidate emoji 121' and the representation of the incoming emoji 111', e.g., such as the action of two entities performing a high five. In some embodiments, the animated emoji 116 may not directly show a representation of the incoming emoji 111' and a representation of the candidate emoji 121'. Instead, the animated emoji 116 may show a representation of activity between the selected emoji, e.g., the first candidate emoji, and the original emoji 111. For instance, the original emoji may include an image of a person and a candidate emoji may include an image of a cake. In this scenario, the animated emoji 116 may include an animation of the person eating the cake but not directly show the cake, instead, the animated emoji 116 can show an action of the cake being eaten.

Figure 5:
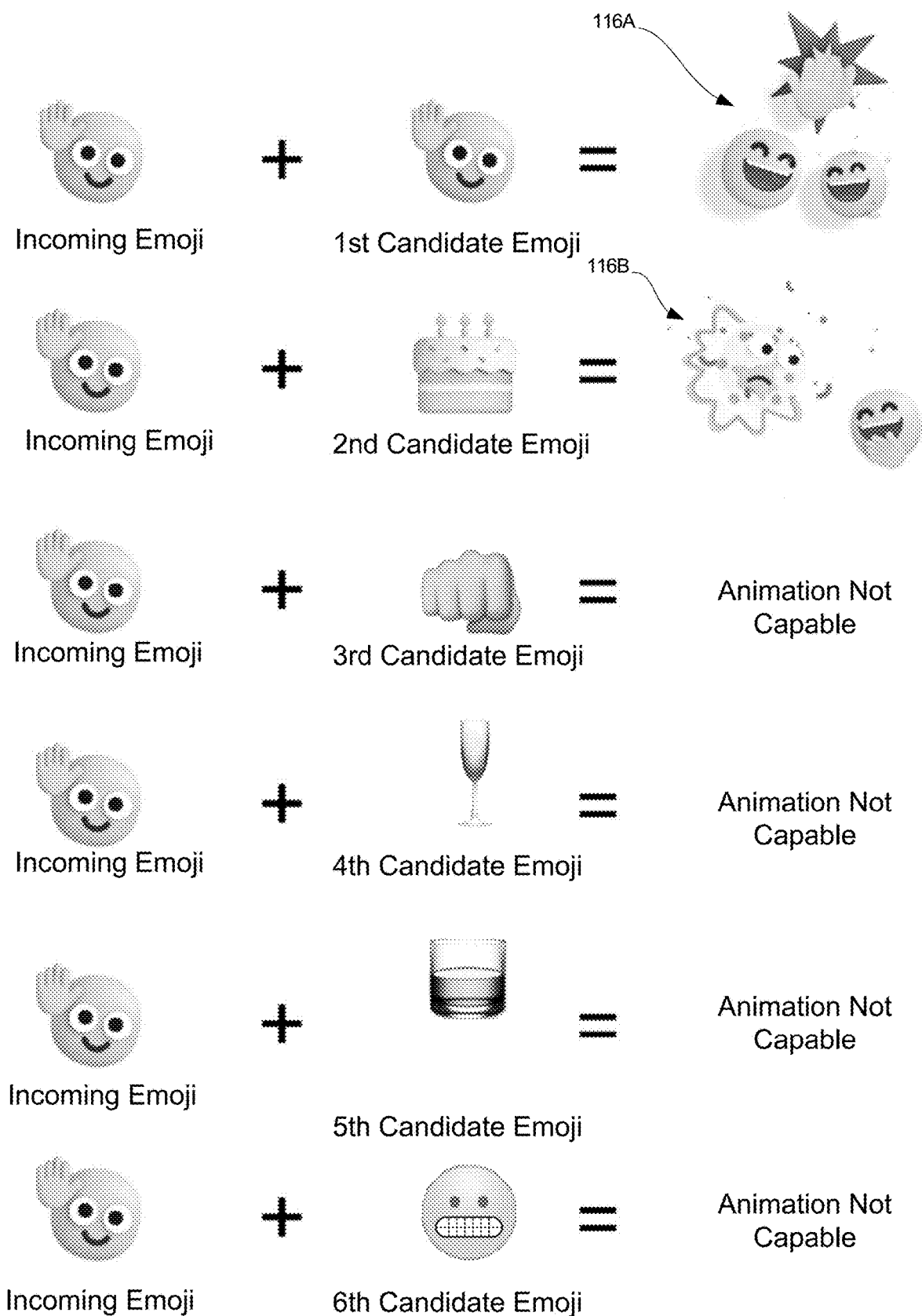
FIG. 5 shows an example of how different candidate emojis can be ranked based on an ability to generate an animation with the original incoming emoji.

FIG. 5 shows an example of how candidate emojis can be ranked based on an ability to generate an animation with the original incoming emoji. As described above, a list of emoji candidates 121 can be ordered based on an animation compatibility of each emoji candidate. This process can include identifying an animated emoji 116 that depicts a particular emoji candidate and the original emoji. The system can perform an analysis of the emoji candidate and the original emoji to determine a context.

For example, with reference to the example on the first row of FIG. 5, the original emoji in this example can be analyzed to produce a context indicating a "high five." The first emoji candidate is also analyzed, and in this example, the system generates a context indicating a "high five" for the first emoji candidate. The system also analyzes individual animated emojis to determine a context. In this case, the first animated emoji 116A also produces a context indicating a "high five." In this example, the system determines that the first animated emoji 116A contains a representation of the incoming emoji and a representation of the first candidate emoji. In response, the system determines that the first candidate emoji is capable of generating animation effects with the original expressive illustration 111. The system also determines that the first animated emoji 116A is to be used in an output response that will be displayed in response to a selection of the first candidate emoji 121A.

With reference to the example on the second row of FIG. 5, the original emoji in this example can be analyzed to produce a context indicating a "high five." The second emoji candidate is also analyzed, and in this example, the system generates a context indicating a "cake that can be used in a high five prank." The system also analyzes the second animated emoji 116B also determines a context indicating a "high five cake prank." In this example, the system determines that the second animated emoji 116B contains a representation of the incoming emoji and a representation of the second candidate emoji. In response, the system determines that the second candidate emoji is capable of generating animation effects with the original expressive illustration 111. The system also determines that the second animated emoji 116B is to be used in an output response that will be displayed in response to a selection of the second candidate emoji.

In the process of determining whether a candidate emoji is capable of generating animation effects, the system can determine if a particular candidate emoji has a context with a threshold match with the context of a particular animated emoji. This can be based on a scoring method and/or involve an AI analysis to determine if one or more keyword phrases or images have a threshold level of a match. Thus, a context of "high five" may be a threshold match with another context of "high five" or a context of "high five cake prank" but not be a threshold match with another context of "fist bump" or "wine glass."

With reference to the example on the third row of FIG. 5, the original emoji in this example can be analyzed to produce a context indicating a "high five." The third emoji candidate is also analyzed, and in this example, the system generates a context indicating a "fist bump." The system also analyzes other animated emojis, which can be from a predetermined collection or database of emojis. If the other animated emojis have a determined context that does not have a threshold match with the context of a particular candidate emoji and a threshold match with the context of the original candidate, the system determines that the third emoji candidate is not capable of generating animation effects with the original expressive illustration. For the remaining candidate emojis 121D-121F in this example, the system determines that the remaining candidate emojis 121D-121F are not capable of generating animation effects with the original expressive illustration 111 given that they have a context that does not have a threshold match with the original expressive illustration 111. For example, the remaining candidate emojis respectively have a context of "wine glass," "water glass," and "grimacing face," which do not have a threshold match with the context of the original emoji, e.g., a "smiley face" and/or a "high five."

The analysis of whether a candidate emoji is capable of generating animation effects with the original expressive illustration may also involve a graphical analysis where images of objects within an animated emoji having a threshold similarity to the emoji candidate and the original emoji may also cause the system to determine that the emoji candidate is capable of generating animation effects with the original emoji. Thus, if the original emoji or the emoji candidate included different graphical properties than the objects within an animated emoji, the system may not deem the animated emoji as having a threshold similarity to the emoji candidate and the original emoji. Thus, the system may not deem the candidate emoji is capable of generating animation effects with the original expressive illustration. The different graphical properties can include but are not limited to different shapes or different display properties, e.g., brightness, hue, shade, etc. For example, if the first candidate showed a face with a frown and a thumbs down image, an interpretation of that image may produce a different context, e.g., "no high five, or unhappy, etc. Given that context, there would not be a threshold match with an animation emoji, such as the first animation emoji 116A, which has a different context.

In some configurations, the candidate emojis can be ranked in in response to receipt of an incoming emoji 111 based on one or more factors or the candidate emojis can be pre-ranked based on one or more factors. For illustrative purposes, the term ranked or ranking of emoji candidates also refers techniques where candidate emojis are ordered, prioritized, or sorted according to one or more detected events (also referred to herein as "detected factors"). Thus, a particular candidate emoji can be boosted in priority over other candidate emojis in response to determining that the particular candidate emoji can be used to generate an animated emoji with an original emoji, while the system determines that the other candidate emojis cannot be used to generate an animated emoji with an original emoji.

The present disclosure provides a number of factors that can be used to change the ranking, e.g., the priority, of particular emojis. For example, the rankings for individual candidates can be based on a detected number of interactions as described herein, e.g., a number of search results that identifies an interaction between a candidate emoji and the original emoji. A higher number of detected interactions can increase a ranking of a particular candidate. In addition, the rankings for individual candidates can be based on the ability for a device to generate an animated effect per the system design. As described in more detail below, candidate emojis related to animated emojis having a format that can be displayed on client devices are ranked higher than candidate emojis related to animated emojis having a format that cannot be displayed on client devices.

In yet another example, a determined context of a conversation in the text messages that are sent in association with an original emoji can be used to rank each candidate emoji. In such embodiments, a system can use a natural language processing (NLP) algorithm to determine a topic of the conversation and then rank individual emoji candidates based upon which animations are appropriate for the detected topics. In one illustrative example, if text messages sent with the incoming emoji referred to a "birthday celebration" or a "party" and metadata related to the second emoji candidate indicated a context or topic of a "birthday cake" and metadata related to the first emoji candidate did not indicate a context or topic of a "birthday" "celebration," or a "party" the system would provide a higher ranking for the second emoji candidate versus the first emoji candidate. This technique can also be applied to animated emojis as well. Thus, prespecified topics for each animation emoji can be detected and used to select a specific animation emoji 116 when a matching topic is detected in associated text messages of a thread. In the above-described example, if the second animation emoji 116B is associated with prespecified topics, such as "birthday celebration" or a "party" and the first animation emoji 116A is not is associated with pre-specified topics, such as "birthday celebration" or a "party", the system would rank the second animation emoji 116B and/or the associated candidate emoji 121B higher on the list. For illustrative purposes, a higher ranking can also mean that a particular factor increases a score for a particular candidate and several scores using different factors can be used individually or combined to determine an overall ranked list of the candidate emojis.

With reference to the example emojis of FIG. 5, an example of a ranking of the candidate emojis is shown in TABLE 1. In this example, the ranking is based on individual score components from (1) the context of the related messages ("Message Context"), (2) a number of detected interactions ("Detected Interactions"), and (3) an ability to generate an animated effect per the system design ("System Design"). These scores can be used individually or combined to determine a rank of each candidate emoji. These examples scores can represent detected events ("detected interactions") for each emoji candidate. For example, the Message Context category ("Message") can be a score of 1 if a topic of the text has a threshold match with a topic of the emoji candidate, or the score can be a 0 if a topic of the text does not have a threshold match with a topic of the emoji candidate. The detected interactions ("Interactions") can be a count of a number of articles, videos, or social media posts that show an interaction between the candidate and the original emoji. The detected interactions can be a weighted count, e.g., a raw count that is normalized, or a raw count of detected interactions. The detected interactions can be a filtered count. In the embodiment using the filtered count, the system can reduce the score of detected interactions based on search results that do not meet one or more criteria with respect to matching criteria or a relevancy confidence score. The System Design factor ("Design") can be a binary score where the score can be 1 if an associated animated emoji can be rendered on a device the score can be a 0 if an associated animated emoji cannot be rendered on a device.

TABLE 1

First Example Ranking of Candidate Emojis Based on Multiple Factors

| Emoji Candidate | Message | Interactions | Design | Rank |
| --- | --- | --- | --- | --- |
| First Candidate | 1 | 20 | 1 | 22 |
| Second Candidate | 0 | 20 | 1 | 21 |
| Third Candidate | 0 | 0 | 1 | 1 |
| Fourth Candidate | 1 | 0 | 1 | 2 |
| Fifth Candidate | 1 | 0 | 1 | 2 |
| Sixth Candidate | 1 | 0 | 1 | 1 |

The rankings for the candidate emojis of TABLE 1 can result from a scenario where the messages sent with the incoming emoji refer to a "birthday celebration" or a "party" and metadata related to the second emoji candidate indicated a context of a "birthday cake" and metadata related to the first emoji candidate did not indicate a context of a "birthday" "celebration," or a "party." Thus, since the messages are related to the second candidate emoji, and the messages are not related to the first candidate emoji, the ranking and/or score of the second candidate emoji is higher than the first candidate emoji. Thus, the display of the second candidate emoji would appear in a more prominent location versus the first candidate emoji in an ordered menu 120.

Conversely, as shown in TABLE 2, if the messages sent with the incoming emoji refer to a "sporting event" or a "victory" and metadata related to the first emoji candidate indicated a context of a "sporting event" or a "victory" and metadata related to the second emoji candidate did not indicate a context of a "sporting event" or a "victory," the system would generate a higher ranking and/or score for the first emoji candidate versus the second emoji candidate. Thus, since the messages are related to the first candidate emoji, and the messages are not related to the second candidate emoji, the ranking and/or score of the first candidate emoji is higher than the second candidate emoji. Thus, the display of the first candidate emoji would appear in a more prominent location in the UI versus the second candidate emoji in an ordered menu 120.

TABLE 2

Second Example Ranking of Candidate Emojis Based on Multiple Factors

| Emoji Candidate | Message | Interactions | Design | Rank |
| --- | --- | --- | --- | --- |
| First Candidate | 1 | 20 | 1 | 22 |
| Second Candidate | 0 | 20 | 1 | 21 |
| Third Candidate | 0 | 0 | 1 | 1 |
| Fourth Candidate | 1 | 0 | 1 | 2 |
| Fifth Candidate | 1 | 0 | 1 | 2 |
| Sixth Candidate | 1 | 0 | 1 | 1 |

Although the above-described examples only show changes in the score component for the topics detected in the messages, it can be appreciated that the total scores can also be influenced by changes in the other factors, including but not limited to, the number of detected interactions, the system design, or system capabilities. Changes for each of the factors can change each respective score components and ultimately change the total score which is used to rank each emoji candidate and/or the associated animated emoji 116 (animation emoji). These examples illustrated in the Tables show how each score component can influence the total score and thus the ranking of each candidate emoji. However, user preferences and other settings can be used to filter or apply weights to select score components. Thus, one user can have their rankings rely more on, or solely on, the context of the messages and a number of interactions, while other users can rely more on another factor, such as the system design and/or system capabilities. It can be appreciated that any ranking for any candidate emoji can be based on any combination of score components to determine a score and ranking of each emoji candidate.

In some embodiments, a particular emoji candidate may have its recommendation boosted, emphasized, or have its ranking or priority raised in response to one or more detected events. For example, the recommendations for emoji candidates may have some relevance rank that determines which of all the emojis to show and the ranked higher may be a boost to those rankings such that without the boost, the emoji may not be displayed as a candidate emoji. Thus, in the example of FIG. 1B, some of the candidate emojis, such as the emoji candidates 121C through 121F may not be displayed in response to determining that they are not capable of generating an animation with the original emoji. With reference to the examples in the tables described above, the system may also filter some candidate emojis if the score does not meet a threshold. For example, if a threshold score is 19, the first two candidates would be included in a ranked list 120, and the other candidates would be filtered and not included in the ranked list 120.

Figure 6A:
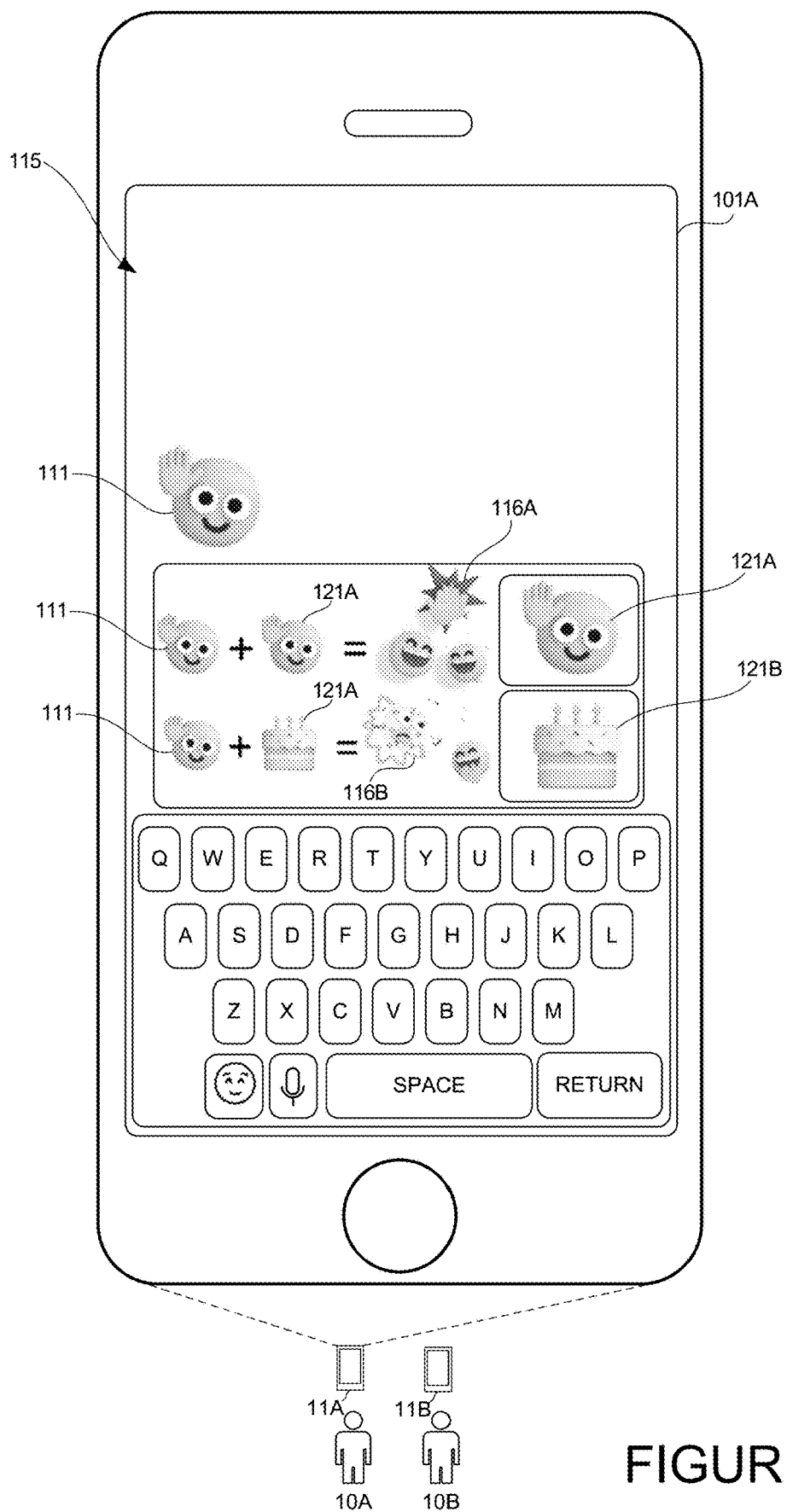
FIG. 6A shows a first state of a user interface arrangement used in a process for generating a list of suggested emoji candidates that are arranged according to a determination of whether a candidate emoji is capable of generating animated effects with an original incoming emoji and/or capable of generating an animated effect per the system design.
Figure 6B:
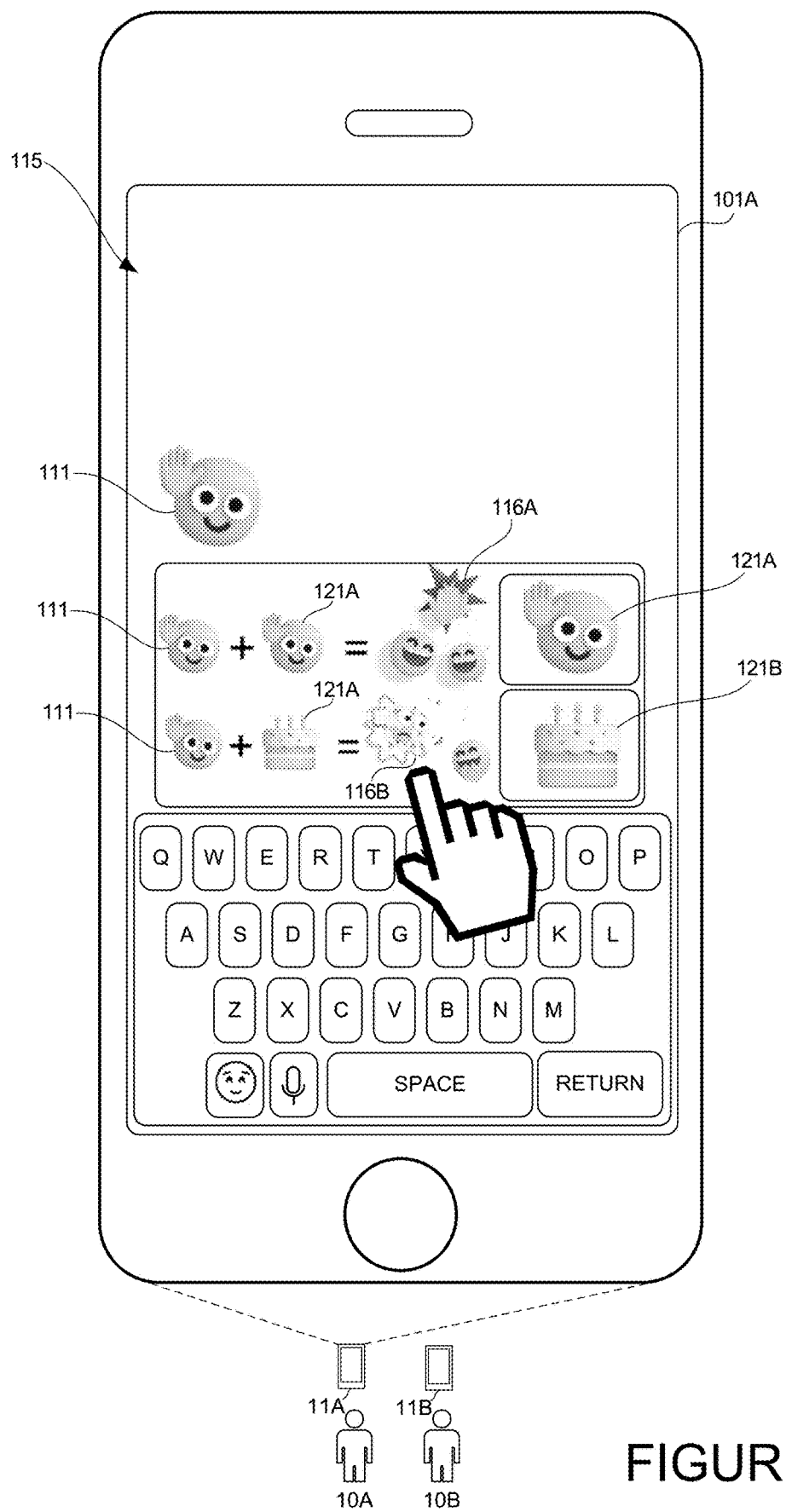
FIG. 6B shows a second state of a user interface arrangement used in a process for generating a list of suggested emoji candidates that are arranged according to a determination of whether a candidate emoji is capable of generating animated effects with an original incoming emoji and/or capable of generating an animated effect per the system design.
Figure 6C:
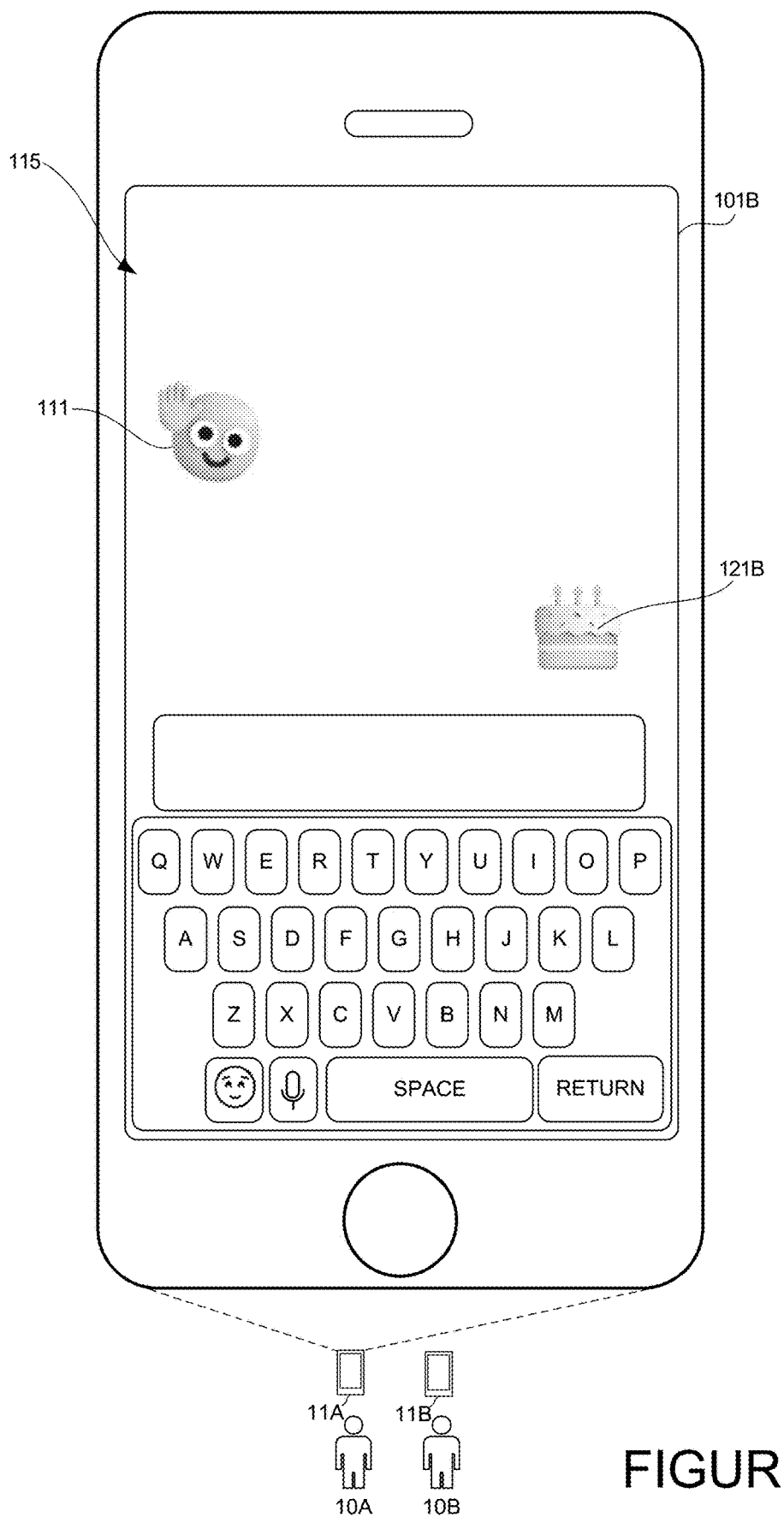
FIG. 6C shows a third state of a user interface arrangement used in a process for generating a list of suggested emoji candidates that are arranged according to a determination of whether a candidate emoji is capable of generating animated effects with an original incoming emoji and/or capable of generating an animated effect per the system design.
Figure 6D:
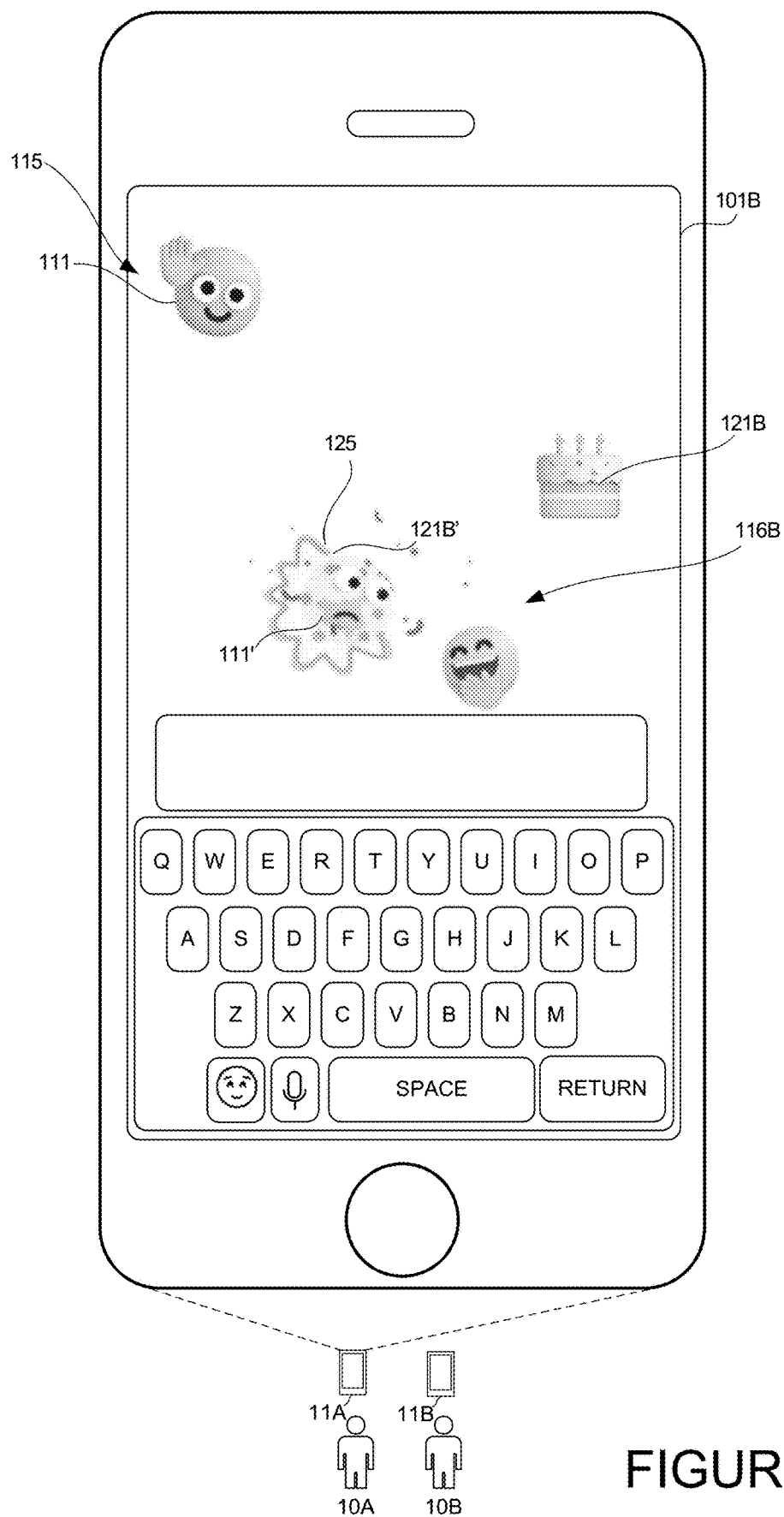
FIG. 6D shows a fourth state of a user interface arrangement used in a process for generating a list of suggested emoji candidates that are arranged according to a determination of whether a candidate emoji is capable of generating animated effects with an original incoming emoji and/or capable of generating an animated effect per the system design.

Turning now to FIGS. 6A-6C, an example process showing an ordered list according to one or more detected interactions is shown and described below. This example shows how emoji candidates can be ranked even if multiple emoji candidates are capable of generating animation effects with the original emoji. As shown in FIG. 6A, the system can also display a combination of emojis for a user selection, where each emoji candidate is displayed in an ordered list (top to bottom) and each emoji candidate is displayed with the original emoji and a resulting animation emoji. The highest ranked emoji candidate 121A is listed at the top and the second ranked emoji candidate 121B is listed second. In this example, the system can receive a selection at either the animated emoji 116 or at a corresponding emoji candidate 121. As shown in FIG. 6B, a user selection is received at the second animated emoji 116B. In response, as shown in FIG. 6C, the second emoji candidate 121B is displayed on the thread. Then, as shown in FIG. 6D, the thread is updated on both devices to show the second animated emoji 116B. The as being added to the existing thread. The second animated emoji 116B shows an interaction between a representation of the input emoji 111' and a representation of the selected candidate emoji 121B', and a graphic 125 showing a representation of an action between the representation of the input emoji 111' and a representation of the selected candidate emoji 121B'. A similar display is shown in the display of the second computing device 11B, where the user selection of either the second emoji candidate 121B or the second animated emoji 116B at the first computing device 11A causes the second computing device to first display the second emoji candidate 121B to the thread, and then automatically display the second animated emoji 116B following the display of the second emoji candidate 121B.

The detected interactions can be used to rank each candidate emoji. In addition, the context of each emoji can be used to detect interactions to determine how each emoji can be ranked. For example, an image of a wine glass would be analyzed to determine keywords "wine glass" and "celebration." Such keywords can be used to determine if there is an image, emoji or an article that determines if a candidate emoji is capable of generating animated effects with an original incoming emoji. If a threshold number of interactions are detected, the candidate emoji is determined to be capable of generating animated effects with an original incoming emoji. In one illustrative example, consider a scenario where an incoming emoji is a wine glass, and a candidate emoji is a beer glass. In this scenario, when the wine glass and the beer glass are compared with an animation emoji having two wine glasses illustrating an action of toasting, although the context of the wine glass would produce a threshold match with the animation emoji, the context of the beer glass would not produce a threshold match with the animation emoji. Thus, the analysis of the two emojis compared with the animation emoji would not produce a detection of an interaction between the two emojis, e.g., the incoming emoji and the candidate emoji. However, when the analysis involves an animation emoji involving a wine glass and a beer class performing a toast, the system would detect an interaction between the two emojis, e.g., the incoming emoji and the candidate emoji, since they both have a threshold match with the animation emoji.

This embodiment can be applied to articles and other artifacts found in a search of other resources. For example, the system can generate a query sent to one or more search engines or a database to identify articles images or videos indicating an interaction between the incoming emoji and a candidate emoji. If the incoming emoji and the candidate emoji involve two wine glasses, the search results would produce a first number of videos, articles or other search results that indicate an interaction between two wine glasses. However, in another scenario where the incoming emoji and the candidate emoji involve a wine glass and a beer glass, the search results would produce a second number of videos, articles or other search results that indicate an interaction between the wine glass and the beer glass. For illustrative purposes, if the first number of videos, articles or other search results for the two wine glasses is above a threshold, and a second number of videos, articles or other search results for the wine glass and the beer glass, is below a threshold, the system would determine that the candidate emoji of the wine glass is capable of generating animated effects with the original incoming emoji, e.g., the wine glass. However, at the same time, the system would determine that the candidate emoji of the beer glass is not capable of generating animated effects with the original incoming emoji, e.g., the wine glass.

Thus, a candidate emoji can be determined to be capable of generating animated effects with the input emoji based on identified search results, e.g., where each identified search result can be counted as an interaction between an input emoji and a candidate emoji. In addition, each identified search result can be from any suitable source, which can be in the form of a database of emojis, an internet search, an artificial intelligence model, etc. The system can generate queries of keywords or images to send to one or more resources. The resources then respond to the queries to which the system can determine a number of articles, videos, images, or emojis show detected interactions between. The system can do a direct count or a filtered count to identify a number of the detected interactions, e.g., a number of search results indicating an interaction between an object depicted in the original expressive illustration and an object depicted in the individual candidate expressive illustration, wherein the search results can include at least one of a number of articles, images, videos, or emojis illustrating or describing the interaction between the object depicted in the original expressive illustration and the object depicted in the individual candidate expressive illustration. The filtered count can be performed by eliminating search results that do not meet one or more criteria with respect to matching criteria or a relevancy confidence score. For example, if a system generates a query to an AI database or a general Web search that states: "show smiley face high-five emojis interacting with a first bump emoji" the system may receive a number of responses along with a confidence score with each response. The system may only count the responses, e.g., the detected interactions, with a threshold confidence score.

The number of detected interactions for each candidate emoji can also be used to rank candidate emojis that are capable of generating animated effects with the original emoji. For instance, in the example of FIG. 1B, the first candidate emoji 121A can be positioned, e.g., ranked higher, than the second candidate emoji 121B, in a situation where the system generates a number of queries for each candidate expression and the first candidate emoji 121A generates a higher number of search results than the second candidate emoji 121B. In such an example, the system generates a first query using the input emoji and the first candidate emoji, and/or contextual data describing these emojis. In response, the system may receive a first number of results, e.g., text descriptions, articles, videos, or emojis verifying the existence of interactions between the objects in the input emoji and the first candidate emoji. If the first number of results is above a threshold, the system can determine that the first candidate emoji is capable of generating animated effects with the input emoji.

The system can also generate a second query using the input emoji and a second candidate emoji, and/or contextual data describing these emojis. In response, the system may receive a second number of results, e.g., text descriptions, articles, videos, or emojis verifying the existence of interactions between the objects in the input emoji and the second candidate emoji. If the second number of results is above a threshold, the system can determine that the second candidate emoji is capable of generating animated effects with the input emoji.

The system can compare the first number of results and the second number of results and if the first number of results is greater than the second number of results, then system can prioritize the first candidate emoji over the second candidate emoji, and position the first candidate emoji higher on the list than the second candidate emoji. Thus, the number of detected interactions can be used for two functions: the number of detected interactions for a candidate emoji can be used to determine if a particular candidate emoji is capable of generating animated effects with an input emoji, and the number of detected interactions for a candidate emoji can be used to rank that candidate emoji compared to other candidates that are also capable of generating animated effects with the input emoji.

Figure 7:
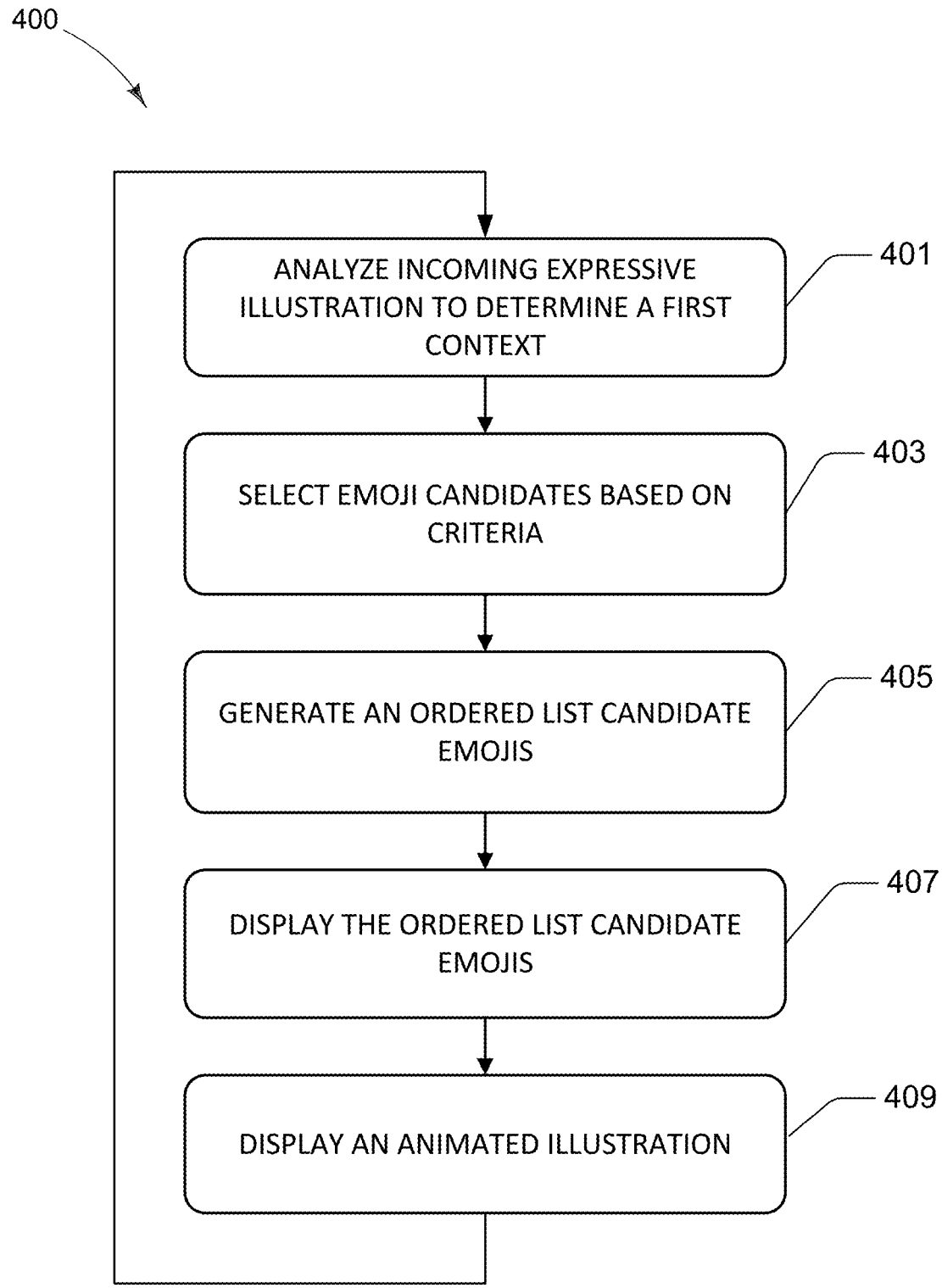
FIG. 7 is a flow diagram showing aspects of a routine for the disclosed techniques.

Turning now to FIG. 7, aspects of a routine 400 for the disclosed techniques. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may also be implemented in many other ways. For example, the routine may be implemented, at least in part, by a processor of another remote computer or a local circuit. In addition, one or more of the operations of the routine may alternatively or additionally be implemented, at least in part, by a chipset working alone or in conjunction with other software modules. Any service, circuit or application suitable for providing input data indicating the position or state of any device may be used in operations described herein.

Routine starts at operation 401 where the system analyzes the original emoji to determine a context. This can include an analysis to determine a context based on the analysis of a depicted image or based on the analysis of metadata associated with the original emoji. An example of a context can include keywords or phrases, such as happy, sad, or grimacing. The context can also describe an object or an action, a wine glass, or a toasting a wine glass, a high five with a happy face, etc. In one example, a wine glass emoji has context keywords: wine, glass, celebrate, happy, toast. The context can be derived from a database of keywords or an analysis of an image identifier that determines objects and activities from an image or a video. In one example, the operation of block 401 can include analyzing the incoming expressive illustration to determine a first context.

At operation 403, the system selects emoji candidates based on criteria. In some embodiments, selected emoji candidates from a collection of emojis can each have keywords that meet a matching criteria. For example, a wine glass emoji can have associated keywords, such as wine, celebrate, happy, toast. The system selects emoji candidates with keywords having a matching threshold. For example, if an incoming emoji is the wine glass with the above-described keywords, the system may select emojis having at least one matching keyword. Examples of candidates that meet this example criteria include (1) another wine glass (matching keywords), (2) a beer glass (matching the words "toast" and "celebrate"), (3) a smiley face (matching the word "happy"). Thus, operation 403 can include selecting one or more candidate expressive illustrations that each have an individual context having a threshold match with the first context.

At operation 403, the system displays an incoming message with an original emoji ("expressive illustration") that is received at a computer of a first user. This operation includes causing a display of the original expressive illustration 111 in a message thread 115 on a user interface 101A of a first computing device 11A of a first user 10A, where the original expressive illustration 111 is sent from a second computing device 11B of a second user 10B.

At operation 405, the system generates a list 120 of one or more candidate expressive illustrations 121, wherein an order of the list 120 is based on an animation compatibility for each of the one or more candidate expressive illustrations 121, wherein an individual animation compatibility is based on one or more detected interactions between an individual candidate expressive illustration 121A and the original expressive illustration 111. For example, a particular candidate emoji is listed higher if it (1) capable of generating an animated effects per system design (2) with the initial emoji that the user is responding to, compared to another candidate emoji that is not capable, or less capable, of generating an animated effects per system design (2) with the initial emoji that the user is responding to.

At operation 407, the system causes a display of the list 120 on the first computing device 11A of the first user 10A, wherein the list 120 of the one or more candidate expressive illustrations 121 that has the order based on the animation compatibility for each of the one or more candidate expressive illustrations 121. The original expressive illustration 111 is concurrently displayed with the ordered list 120 of the one or more candidate expressive illustrations 121. An example of shown in FIG. 1B.

At operation 409, the system causes a display of an animated illustration 116 depicting an action of a representation of the individual expressive illustration 121A', wherein the animated illustration 116 is displayed in the message thread 115 for display on the user interface 101B of the second computing device 11B of the second user 10B. In some embodiments, the animated illustration 116 is displayed in response to a selection of the individual expressive illustration 121A from the list 120 of candidate expressive illustrations 121. An example of operation 409 is shown in FIG. 1D, where the recipient "first user" of the original message selects a candidate emoji for a reply, and in response the system displays a corresponding animated emoji.

The animated illustration 116 can include a single image that includes a representation of the outgoing expressive illustration interacting with a representation of the original expressive illustration. The animated illustration 116 can include a single image of the two objects performing an action, e.g., to entities performing a high five or the act of an object being thrown into another object, etc. In another embodiment, the animated illustration can also be in the form of a multi-frame animation with multiple images showing the action, such as a first frame of a first object being thrown towards the second object, other frames showing the first object moving towards the second object, and additional frames showing the first object making contact with the second object.

The above-described routine covers a scenario where an original emoji is received, and a list of reply candidates are presented to a user "first user." The reply candidates are ordered based on their animative compatibility with the original emoji. Such embodiments can include a method for selecting an individual expressive illustration for a response to an original message comprising an original expressive illustration, the method for execution on a system, the method comprising, causing a display of the original expressive illustration 111 in a message thread 115 on a user interface 101A of a first computing device 11A of a first user 10A, where the original expressive illustration 111 is sent from a second computing device 11B of a second user 10B, this can include an incoming message with an original emoji "expressive illustration" is received at a computer of a first user; the method further comprises generating a list 120 of one or more candidate expressive illustrations 121, wherein an order of the list 120 is based on an animation compatibility for each of the one or more candidate expressive illustrations 121, wherein an individual animation compatibility is based on one or more detected interactions between an individual candidate expressive illustration 121A and the original expressive illustration 111, in one example, a candidate emoji is listed higher if it 1 capable of generating an animated effects per system design 2 with the initial emoji that the user is responding to, the method further comprises causing a display of the list 120 on the first computing device 11A of the first user 10A, wherein the list 120 of the one or more candidate expressive illustrations 121 that has the order based on the animation compatibility for each of the one or more candidate expressive illustrations 121, wherein the original expressive illustration 111 is concurrently displayed with the ordered list 120 of the one or more candidate expressive illustrations 121, an example of this is shown in FIG. 1B, where the ordered list is displayed with the initial emoji that the first user is responding to, the method further comprises receiving a selection of the individual expressive illustration 121A from the list 120 of candidate expressive illustrations 121, this is shown in FIG. 1C where a recipient, e.g., the "first user" of the original message selects a candidate emoji for a reply, the method further comprises causing a display of an animated illustration 116 depicting a representation of the individual expressive illustration 121A' interacting with a representation of the original expressive illustration 111', wherein the animated illustration 116 is displayed in the message thread 115 for display on the user interface 101B of the second computing device 11B of the second user 10B, this is shown in FIG. 1D where a selected reply emoji, or representation of the reply emoji, is sent to the sender "second user" of the original message.

In some embodiments, the response emoji can be an animation involving an interaction between the incoming emoji and the outgoing emoji as a static image or a moving image. The representation can be used instead of an image of an object depicted in an emoji used since the interaction may not have the same image as the original emoji or the candidate emoji. Thus, in the routine, the animated illustration 116 comprises a multi-frame motion image or a single-frame image of the interaction, wherein the representation of the original expressive illustration or the representation of the original expressive illustration are represented by a graphical illustration representing an action or movement.

In some embodiments, the animation capability can be determined by an analysis of existing animation emojis. System examines existing animation emojis to see if they have a context that has a threshold similarity with the original emoji and each candidate. The context can be generated from either an AI analysis of graphics using an image model or the context can come from keywords of metadata associated with an emoji. A threshold compatibility can be a score that is raised or lowered with detected similarities between objects. For instance, if an AI model determines that an object of an incoming emoji has a similarity level with an animation emoji 116 that is above a similarity threshold, and the AI model determines that an object of a candidate emoji has a similarity level with an animation emoji 116 that is above a similarity threshold, the system can determine that the candidate emoji is capable of generating animated effects with an original incoming emoji. The model can include an AI image model or a text model for analysis of keywords associated with each emoji. In such embodiments, the routine can determine the one or more detected interactions between the individual candidate expressive illustration and the original expressive illustration by determining a context describing the original expressive illustration; determining a context describing the individual candidate expressive illustration; determining that the context describing the original expressive illustration and the context describing the individual candidate expressive illustration meet a threshold match with a context of the animated illustration; and in response to determining that the context describing the original expressive illustration and the context describing the individual candidate expressive illustration meet a threshold match with a context of the animated illustration: determining that the individual candidate expressive illustration has a threshold animation compatibility with the original expressive illustration, and ranking the individual candidate expressive illustration over other candidate expressive illustrations that do not have the threshold animation compatibility with the original expressive illustration, wherein a higher-ranking candidate expressive illustration are positioned in a predetermined location on the user interface of the first computing device relative to the other candidate expressive illustrations.

In some embodiments, the routine can also include determining the context describing the original expressive illustration comprises an analysis of an object depicted in the original expressive illustration to determine one or more keywords describing the original expressive illustration, wherein determining the context describing the individual candidate expressive illustration comprises an analysis of an object depicted in the individual candidate expressive illustration to determine one or more keywords describing the individual candidate expressive illustration, wherein determining that the individual candidate expressive illustration has the threshold animation compatibility with the original expressive illustration comprises determining that the one or more keywords describing the original expressive illustration and the one or more keywords describing the individual candidate expressive illustration have a threshold match with one or more keywords describing the animated illustration.

The context of each emoji can be used to detect interactions to determine how each emoji can be ranked. For example, an image of a wine glass would be analyzed to determine keywords "wine glass" and "celebration." Such keywords can be used to determine if there is an image, emoji or an article that determines if a candidate emoji is capable of generating animated effects with an original incoming emoji. If a threshold number of interactions are detected, the candidate emoji is determined to be capable of generating animated effects with an original incoming emoji. In one illustrative example, consider a scenario where an incoming emoji is a wine glass, and a candidate emoji is a beer glass. In this scenario, when the wine glass and the beer glass are compared with an animation emoji having two wine glasses illustrating an action of toasting, although the context of the wine glass would produce a threshold match with the animation emoji, the context of the beer glass would not produce a threshold match with the animation emoji. Thus, the analysis of the two emojis compared with the animation emoji would not produce a detection of an interaction between the two emojis, e.g., the incoming emoji and the candidate emoji. However, when the analysis involves an animation emoji involving a wine glass and a beer class performing a toast, the system would detect an interaction between the two emojis, e.g., the incoming emoji and the candidate emoji, since they both have a threshold match with the animation emoji.

This embodiment can be applied to articles and other artifacts found in a search of other resources. For example, the system can generate query sent to one or more search engines or a database to identify articles images or videos indicating an interaction between the incoming emoji and a candidate emoji. If the incoming emoji and the candidate emoji involve two wine glasses, the search results would produce a first number of videos, articles or other search results that indicate an interaction between two wine glasses. However, in another scenario where the incoming emoji and the candidate emoji involve a wine glass and a beer glass, the search results would produce a second number of videos, articles or other search results that indicate an interaction between the wine glass and the beer glass. For illustrative purposes, if the first number of videos, articles or other search results for the two wine glasses is above a threshold, and a second number of videos, articles or other search results for the wine glass and the beer glass, is below a threshold, the system would determine that the candidate emoji of the wine glass is capable of generating animated effects with the original incoming emoji, e.g., the wine glass. However, at the same time, the system would determine that the candidate emoji of the beer glass is not capable of generating animated effects with the original incoming emoji, e.g., the wine glass.

Thus, a candidate emoji can be determined to be capable of generating animated effects with the input emoji based on identified search results, e.g., where each identified search result can be counted as an interaction between an input emoji and a candidate emoji. In addition, each identified search result can be from any suitable source, which can be in the form of a database of emojis, an internet search, an artificial intelligence model, etc. The system can generate queries of keywords or images to send to the one or more resources. The resources then respond to the queries to which the system can determine a number of articles, videos, images, or emojis show detected interactions between. The system can do a direct count or a filtered count to identify a number of the detected interactions, e.g., a number of search results indicating an interaction between an object depicted in the original expressive illustration and an object depicted in the individual candidate expressive illustration, wherein the search results can include at least one of a number of articles, images, videos, or emojis illustrating or describing the interaction between the object depicted in the original expressive illustration and the object depicted in the individual candidate expressive illustration. The filtered count can be performed by eliminating search results that do not meet one or more criteria with respect to matching criteria or a relevancy confidence score. For example, if a system generates a query to an AI database or a general Web search that states: "show smiley face high-five emojis interacting with a first bump emoji" the system may receive a number of responses along with a confidence score with each response. The system may only count the responses with a threshold confidence score.

The number of detected interactions for each candidate emoji can also be used to rank candidate emojis that are capable of generating animated effects with the original emoji. For instance, in the example of FIG. 1B, the first candidate emoji 121A can be positioned, e.g., ranked higher, than the second candidate emoji 121B, in a situation where the system generates a number of queries for each candidate expression and the first candidate emoji 121A generates a higher number of search results than the second candidate emoji 121B. In such an example, the system generates a first query using the input emoji and the first candidate emoji, and/or contextual data describing these emojis. In response, the system may receive a first number of results, e.g., text descriptions, articles, videos, or emojis verifying the existence of interactions between the objects in the input emoji and the first candidate emoji. If the first number of results is above a threshold, the system can determine that the first candidate emoji is capable of generating animated effects with the input emoji.

The system can also generate a second query using the input emoji and a second candidate emoji, and/or contextual data describing these emojis. In response, the system may receive a second number of results, e.g., text descriptions, articles, videos, or emojis verifying the existence of interactions between the objects in the input emoji and the second candidate emoji. If the second number of results is above a threshold, the system can determine that the second candidate emoji is capable of generating animated effects with the input emoji.

The system can compare the first number of results and the second number of results and if the first number of results is greater than the second number of results, then system can prioritize the first candidate emoji over the second candidate emoji, and position the first candidate emoji higher on the list than the second candidate emoji. Thus, the number of detected interactions can be used for two functions: the number of detected interactions for a candidate emoji can be used to determine if a particular candidate emoji is capable of generating animated effects with an input emoji, and the number of detected interactions for a candidate emoji can be used to rank that candidate emoji compared to other candidates that are also capable of generating animated effects with the input emoji. By determining a priority for emoji candidates based on search results from public information, which may include social media sources, the system can prioritize emoji graphics based on current trends. If a cake throwing emoji is less popular in a first timeframe versus the high-five emoji, but then later, at a second timeframe, the cake throwing emoji is more popular in than the high-five emoji, the system can rank these two different emoji candidates and their corresponding animation emoji based on current trends.

The number of detected interactions can also be used to determine if the system is to generate a new animated emoji. For example, if search results of a wine glass emoji and a beer glass emoji produce more than a threshold number of articles, videos, and social media posts, and if the system determines that a corresponding animation emoji does not exist, the system can submit images of the wine glass emoji and the beer glass emoji to an artificial intelligence model to cause the generation of an animation emoji showing an interaction between the wine glass emoji and the beer glass emoji. In such an embodiment, the system can generate a command having both the wine glass emoji and the beer glass emoji along with a text description of the desired action, e.g., the action of the wine glass performing a toast with the beer glass. That resulting animation emoji can be displayed to the thread, as shown in the example of FIG. 6D.

In the above-described routine can also include determining the one or more detected interactions between the individual candidate expressive illustration and the original expressive illustration comprises: providing an input to an image model to determine if an object depicted in the original expressive illustration and an object depicted in the individual candidate expressive illustration has a threshold similarity level with objects depicted in the animated illustration; determining that the one or more detected interactions meets one or more criteria if an output of the model indicates the threshold similarity level with objects depicted in the animated illustration; and increasing a priority ranking of the individual candidate expressive illustration in the list over other candidate expression illustrations in response to determining that the one or more detected interactions meets the one or more criteria.

In some embodiments, a candidate emoji is listed higher on a list or ranked higher in priority if it is (1) capable of generating an animated effect per the system design and/or (2) capable of generating an animated effect with the initial emoji that the user is responding to. Thus, although a candidate emoji is capable of generating an animated effect with the initial emoji that the user is responding to, that candidate emoji may, or may not, be ranked higher if it is not capable of generating an animated effect per the system design. An emoji that is capable of generating an animated effect per the system design can include any type of emoji that has a data format that is compliant with a particular device type. For instance, if an emoji candidate is stored in a data format that cannot be rendered on a device due to a lack of hardware or software capabilities of a device, that emoji candidate is capable of generating an animated effect per the system design. However, if an emoji candidate is stored in a data format that can be rendered on a device using hardware or software capabilities of the device, that emoji candidate is capable of generating an animated effect per the system design.

In another example, a system may determine that a particular emoji candidate is not capable of generating an animated effect per the system design based on a device type and/or device capabilities. For example, with reference to FIG. 6A, consider a scenario where the first candidate emoji 121A is associated with an animation emoji 116A that is a static, single-frame image emoji. Also, the second candidate emoji 121B is associated with an animation emoji 116A that is a dynamic, multi-frame image emoji. Also, in this example, the first user is using an iPhone, which is capable of displaying both multi-frame images, e.g., motion emojis, and single-frame images. The second user is using a Motorola flip phone with limited display capabilities that is unable to show multi-frame images, e.g., motion emojis, but it is able to display single-frame images. The system may detect the type of the two devices and determine that the second device is not capable of displaying motion-based, multi-frame emoji. In response to this determination, the system can determine that the second device is not capable of displaying an animation emoji that is associated with the second candidate emoji 121B. Thus, the system will rank the second candidate emoji 121B below, or with a lower priority than, the first candidate emoji 121A on the list, as shown in FIG. 6A. In this example, if the user were to select the first candidate emoji 121A, the system would cause the display of the first candidate emoji 121A and then an automatic display of the first animation emoji 116A that corresponds to the first candidate emoji 121A. If the user were to select the second candidate emoji 121B, the system would display the second candidate emoji 121B. The system would also perform a search for an equivalent graphical expression, and then display that equivalent graphical expression that has a threshold similarity level with the second animation emoji 116B on the thread. The equivalent graphical expression can be displayed on both the first computing device and the second computing device. The equivalent graphical expression can be a static image showing a representation of the original emoji 111, the second candidate emoji 121B, and/or a representation of an action between the representation of the original emoji 111 and the second candidate emoji 121B.

FIG. 8 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 8 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 606(1) is in some way connected to a display device (e.g., a display screen 629(N)), which can display a UI according to the techniques described herein.

In the example environment 600 of FIG. 8, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 8) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening," device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

FIG. 9 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 604 as shown in FIG. 8), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for selecting an individual illustration for a response to an original message comprising an original illustration, the method for execution on a system, the method comprising:

causing a display of the original illustration in a message thread on a user interface of a first computing device of a first user, where the original illustration is sent from a second computing device of a second user;

analyzing the original illustration to determine a first context of an expression represented in the original illustration;

according to a result of analyzing, selecting one or more candidate illustrations that each has an individual context having a threshold match with the first context of the expression represented in the original illustration;

generating a list of the one or more candidate illustrations, wherein an order of the list is based on an animation compatibility for each of the one or more candidate illustrations, wherein an individual animation compatibility is based on one or more detected interactions between an individual candidate illustration and the original illustration;

causing a display of the list on the first computing device of the first user, wherein the list of the one or more candidate illustrations that has the order based on the animation compatibility for each of the one or more candidate illustrations, wherein the original illustration is concurrently displayed with the ordered list of the one or more candidate illustrations;

receiving a selection of the individual candidate illustration from the list of the one or more candidate illustrations; and causing a display of an animated illustration depicting a representation of the individual candidate illustration interacting with a representation of the original illustration, wherein the animated illustration is displayed in the message thread for display on the user interface of the second computing device of the second user.

2. The method of claim 1, wherein the animated illustration comprises a multi-frame motion image or a single-frame image of the interaction, wherein the representation of the individual candidate illustration or the representation of the original illustration are represented by a graphical illustration representing an action or movement.

3. The method of claim 1, wherein determining the one or more detected interactions between the individual candidate illustration and the original illustration comprises: determining a context describing the original expressive illustration; determining a context describing the individual candidate illustration; determining that the context describing the original illustration and the context describing the individual candidate illustration meet a threshold match with a context of the animated illustration; and in response to determining that the context describing the original illustration and the context describing the individual candidate illustration meet a threshold match with a context of the animated illustration: determining that the individual candidate illustration has a threshold animation compatibility with the original illustration, and ranking the individual candidate illustration over other candidate illustrations that do not have the threshold animation compatibility with the original illustration, wherein a higher-ranking candidate illustration is positioned in a predetermined location on the user interface of the first computing device relative to the other candidate illustrations.

4. The method of claim 3, wherein determining the context describing the original illustration comprises an analysis of an object depicted in the original illustration to determine one or more keywords describing the original illustration, wherein determining the context describing the individual candidate illustration comprises an analysis of an object depicted in the individual candidate illustration to determine one or more keywords describing the individual candidate illustration, wherein determining that the individual candidate illustration has the threshold animation compatibility with the original illustration comprises determining that the one or more keywords describing the original illustration and the one or more keywords describing the individual candidate illustration have a threshold match with one or more keywords describing the animated illustration.

5. The method of claim 1, determining the one or more detected interactions between the individual candidate illustration and the original illustration comprises: providing an input to an image model to determine if an object depicted in the original illustration and an object depicted in the individual candidate illustration has a threshold similarity level with objects depicted in the animated illustration; determining that the one or more detected interactions meets one or more criteria if an output of the model indicates the threshold similarity level with objects depicted in the animated illustration; and increasing a priority ranking of the individual candidate illustration in the list over other candidate illustrations in response to determining that the one or more detected interactions meets the one or more criteria.

6. The method of claim 1, wherein the detected interactions includes a number of search results indicating an interaction between an object depicted in the original illustration and an object depicted in the individual candidate illustration, wherein the search results can include at least one of a number of articles, images, videos, or emojis illustrating or describing the interaction between the object depicted in the original illustration and the object depicted in the individual candidate illustration.

7. A computing device selecting an individual illustration for a response to an original message comprising an original illustration, comprising:

one or more processing units; and a computer-readable storage medium having encoded thereon computer-executable instructions to cause the one or more processing units to:

cause a display of the original illustration in a message thread on a user interface of a first computing device of a first user, where the original illustration is sent from a second computing device of a second user;

analyze the original illustration to determine a first context of an expression represented in the original illustration;

according to a result of analyzing, select one or more candidate illustrations that each has an individual context having a threshold match with the first context of the expression represented in the original illustration;

generate a list of the one or more candidate illustrations, wherein an order of the list is based on an animation compatibility for each of the one or more candidate illustrations, wherein an individual animation compatibility is based on one or more detected interactions between an individual candidate illustration and the original illustration;

cause a display of the list on the first computing device of the first user, wherein the list of the one or more candidate illustrations that has the order based on the animation compatibility for each of the one or more candidate illustrations, wherein the original illustration is concurrently displayed with the ordered list of the one or more candidate illustrations;

receive a selection of the individual candidate illustration from the list of the one or more candidate illustrations; and cause a display of an animated illustration depicting a representation of the individual candidate illustration interacting with a representation of the original illustration, wherein the animated illustration is displayed in the message thread for display on the user interface of the second computing device of the second user.

8. The computing device of claim 7, wherein the animated illustration comprises a multi-frame motion image or a single-frame image of the interaction, wherein the representation of the individual candidate illustration or the representation of the original illustration are represented by a graphical illustration representing an action or movement.

9. The computing device of claim 7, wherein determining the one or more detected interactions between the individual candidate illustration and the original illustration comprises: determining a context describing the original illustration; determining a context describing the individual candidate illustration; determining that the context describing the original illustration and the context describing the individual candidate illustration meet a threshold match with a context of the animated illustration; and in response to determining that the context describing the original illustration and the context describing the individual candidate meet a threshold match with a context of the animated illustration: determining that the individual candidate illustration has a threshold animation compatibility with the original illustration, and ranking the individual candidate illustration over other candidate illustrations that do not have the threshold animation compatibility with the original illustration, wherein a higher-ranking candidate illustration are is positioned in a predetermined location on the user interface of the first computing device relative to the other candidate illustrations.

10. The computing device of claim 9, wherein determining the context describing the original illustration comprises an analysis of an object depicted in the original illustration to determine one or more keywords describing the original illustration, wherein determining the context describing the individual candidate illustration comprises an analysis of an object depicted in the individual candidate illustration to determine one or more keywords describing the individual candidate illustration, wherein determining that the individual candidate illustration has the threshold animation compatibility with the original illustration comprises determining that the one or more keywords describing the original illustration and the one or more keywords describing the individual candidate illustration have a threshold match with one or more keywords describing the animated illustration.

11. The computing device of claim 7, determining the one or more detected interactions between the individual candidate illustration and the original illustration comprises: providing an input to an image model to determine if an object depicted in the original illustration and an object depicted in the individual candidate illustration has a threshold similarity level with objects depicted in the animated illustration; determining that the one or more detected interactions meets one or more criteria if an output of the model indicates the threshold similarity level with objects depicted in the animated illustration; and increasing a priority ranking of the individual candidate illustration in the list over other candidate illustrations in response to determining that the one or more detected interactions meets the one or more criteria.

12. The computing device of claim 7, wherein the detected interactions includes a number of search results indicating an interaction between an object depicted in the original illustration and an object depicted in the individual candidate illustration, wherein the search results can include at least one of a number of articles, images, videos, or emojis illustrating or describing the interaction between the object depicted in the original illustration and the object depicted in the individual candidate expressive illustration.

13. A computer-readable storage medium for selecting an individual illustration for a response to an original message comprising an original illustration, the computer-readable storage medium having encoded thereon computer-executable instructions to cause one or more processing units, of a system to:
cause a display of the original illustration in a message thread on a user interface of a first computing device of a first user, where the original illustration is sent from a second computing device of a second user;
analyze the original illustration to determine a first context of an expression represented in the original illustration;
according to a result of analyzing, select one or more candidate illustrations that each has an individual context having a threshold match with the first context of the expression represented in the original illustration;
generate a list of the one or more candidate illustrations, wherein an order of the list is based on an animation compatibility for each of the one or more candidate illustrations, wherein an individual animation compatibility is based on one or more detected interactions between an individual candidate illustration and the original illustration;
cause a display of the list on the first computing device of the first user, wherein the list of the one or more candidate illustrations that has the order based on the animation compatibility for each of the one or more candidate illustrations, wherein the original illustration is concurrently displayed with the ordered list of the one or more candidate illustrations;
receive a selection of the individual candidate illustration from the list of the one or more candidate illustrations; and
cause a display of an animated illustration depicting a representation of the individual candidate illustration interacting with a representation of the original illustration, wherein the animated illustration is displayed in the message thread for display on the user interface of the second computing device of the second user.

14. The computer-readable storage medium of claim 13, wherein the animated illustration comprises a multi-frame motion image or a single-frame image of the interaction, wherein the representation of the individual candidate illustration or the representation of the original illustration is represented by a graphical illustration representing an action or movement.

15. The computer-readable storage medium of claim 13, wherein determining the one or more detected interactions between the individual candidate illustration and the original illustration comprises: determining a context describing the original illustration; determining a context describing the individual candidate illustration; determining that the context describing the original expressive illustration and the context describing the individual candidate illustration meet a threshold match with a context of the animated illustration; and in response to determining that the context describing the original illustration and the context describing the individual candidate illustration meet a threshold match with a context of the animated illustration: determining that the individual candidate illustration has a threshold animation compatibility with the original illustration, and ranking the individual candidate illustration over other candidate illustrations that do not have the threshold animation compatibility with the original illustration, wherein a higher-ranking candidate illustration is positioned in a predetermined location on the user interface of the first computing device relative to the other candidate illustrations.

16. The computer-readable storage medium of claim 13, wherein determining the context describing the original illustration comprises an analysis of an object depicted in the original illustration to determine one or more keywords describing the original illustration, wherein determining the context describing the individual candidate illustration comprises an analysis of an object depicted in the individual candidate illustration to determine one or more keywords describing the individual candidate illustration, wherein determining that the individual candidate illustration has the threshold animation compatibility with the original illustration comprises determining that the one or more keywords describing the original illustration and the one or more keywords describing the individual candidate illustration have a threshold match with one or more keywords describing the animated illustration.

17. The computer-readable storage medium of claim 13, determining the one or more detected interactions between the individual candidate illustration and the original illustration comprises: providing an input to an image model to determine if an object depicted in the original illustration and an object depicted in the individual candidate illustration has a threshold similarity level with objects depicted in the animated illustration; determining that the one or more detected interactions meets one or more criteria if an output of the model indicates the threshold similarity level with objects depicted in the animated illustration; and increasing a priority ranking of the individual candidate illustration in the list over other candidate illustrations in response to determining that the one or more detected interactions meets the one or more criteria.

18. The computer-readable storage medium of claim 13, wherein the detected interactions includes a number of search results indicating an interaction between an object depicted in the original illustration and an object depicted in the individual candidate illustration, wherein the search results can include at least one of a number of articles, images, videos, or emojis illustrating or describing the interaction between the object depicted in the original illustration and the object depicted in the individual candidate illustration.

* * * * *